(12) United States Patent
Grubish et al.

(10) Patent No.: US 7,038,137 B2
(45) Date of Patent: May 2, 2006

(54) FIBER CLOSURE SYSTEM

(75) Inventors: Christopher Stephen Grubish, Solon, OH (US); Brett Allen Latimer, New Castle, PA (US); Keith Alan Miller, Twinsburg, OH (US)

(73) Assignee: Preformed Line Products Company, Mayfield Village, OH (US)

( * ) Notice: Subject to any disclaimer, the term of this patent is extended or adjusted under 35 U.S.C. 154(b) by 0 days.

(21) Appl. No.: 10/871,748

(22) Filed: Jun. 18, 2004

(65) Prior Publication Data

US 2004/0256138 A1    Dec. 23, 2004

Related U.S. Application Data

(60) Provisional application No. 60/479,283, filed on Jun. 18, 2003.

(51) Int. Cl.
*H02G 3/06*    (2006.01)

(52) U.S. Cl. .................. 174/93; 174/72 R; 385/135

(58) Field of Classification Search ................ 174/93, 174/91, 92, 93 TE, 72 R, 77 R; 385/135, 385/137, 134, 136; 428/35.1, 36.9
See application file for complete search history.

(56) References Cited

U.S. PATENT DOCUMENTS

| | | | |
|---|---|---|---|
| 3,966,082 A * | 6/1976 | Hopkins | ..................... 220/793 |
| 4,039,742 A | 8/1977 | Smith | |
| 4,181,814 A | 1/1980 | Smith | |
| 4,314,094 A | 2/1982 | Smith | |
| 4,359,262 A | 11/1982 | Dolan | |
| 4,424,412 A | 1/1984 | Goetter et al. | |
| 4,428,645 A | 1/1984 | Korbelak et al. | |
| 4,549,040 A | 10/1985 | Goetter | |
| 4,558,174 A | 12/1985 | Massey | |
| 4,620,815 A | 11/1986 | Goetter | |
| 4,666,240 A | 5/1987 | Caron et al. | |
| 4,679,896 A | 7/1987 | Krafcik et al. | |
| 4,687,289 A | 8/1987 | DeSanti | |
| 4,733,019 A | 3/1988 | Pichler et al. | |
| 4,743,209 A | 5/1988 | Gittle | |
| 4,799,757 A | 1/1989 | Goetter | |
| 4,805,979 A | 2/1989 | Bossard et al. | |
| 4,808,772 A | 2/1989 | Pichler et al. | |
| 4,902,856 A * | 2/1990 | Miller | ......................... 174/91 |
| 4,927,227 A | 5/1990 | Bensel, III et al. | |
| 5,042,901 A | 8/1991 | Merriken et al. | |
| 5,092,016 A * | 3/1992 | Soong | ......................... 16/2.1 |

(Continued)

FOREIGN PATENT DOCUMENTS

JP     2001176346 A *   6/2001

*Primary Examiner*—Jinhee Lee
(74) *Attorney, Agent, or Firm*—Fay, Sharpe, Fagan, Minnich & McKee, LLP

(57) ABSTRACT

A cable splice enclosure assembly for enclosing and storing cable splices includes a housing member having a closed end and an open end which defines a storage chamber therebetween. An end plate is received in the open end. The end plate is axially spaced from the closed end. The end plate includes an end plate body and a plurality of selectively removable cable caps for accessing individual cables passing through openings defined by the end plate. A plurality of sealing walls are selectively positionable in the openings for blocking the openings when not being used to receive the cables in the openings. A piercable grommet is disposed in a further opening found in the end plate for selectively receiving a ground or other electrical wire therethrough to seal the wire with the end plate.

22 Claims, 20 Drawing Sheets

U.S. PATENT DOCUMENTS

| | | |
|---|---|---|
| 5,185,845 A | 2/1993 | Jones |
| 5,245,133 A | 9/1993 | DeCarlo et al. |
| 5,261,024 A | 11/1993 | Allen et al. |
| 5,278,933 A | 1/1994 | Hunsinger et al. |
| 5,285,515 A | 2/1994 | Milanowski et al. |
| 5,323,478 A | 6/1994 | Milanowski et al. |
| 5,323,480 A | 6/1994 | Mulaney et al. |
| 5,402,515 A | 3/1995 | Vidacovich et al. |
| RE34,955 E | 5/1995 | Anton et al. |
| 5,446,823 A * | 8/1995 | Bingham et al. ............ 385/135 |
| 5,450,518 A | 9/1995 | Burek et al. |
| 5,461,693 A | 10/1995 | Pimpinella |
| 5,490,229 A | 2/1996 | Ghandeharizadeh et al. |
| 5,631,993 A | 5/1997 | Cloud et al. |
| 5,644,671 A | 7/1997 | Goetter et al. |
| 5,825,961 A * | 10/1998 | Wilkins et al. ............. 385/135 |
| 5,883,999 A | 3/1999 | Coud et al. |
| 6,248,953 B1 | 6/2001 | Miller |

* cited by examiner

FIBER CLOSURE SYSTEM

This application claims the benefit of U.S. Provisional Application Ser. No. 60/479,283, filed Jun. 18, 2003.

BACKGROUND OF THE INVENTION

The subject invention is directed to a waterproof cable splice enclosure assembly. Assemblies of the type under consideration are particularly suited for enclosing and housing fiber optic cables, and the invention will be described with particular reference thereto; however, the apparatus could equally well be used with other types of cables.

Many different types of fiber optic cable enclosures are known in the prior art. These prior enclosures are satisfactory to a greater or lesser degree but often have certain defects which make them inconvenient to use or prevent them from being readily adaptable to changing environments and conditions. It is, accordingly, an object of the subject invention to provide a cable enclosure assembly that is easy to assemble, use, and maintain. The subject invention also provides a cable enclosure which can be rapidly modified or adapted for different uses and can be formed in a variety of different sizes with trays and/or internal supports that allow the size and number of splices to vary widely. In addition, the subject invention provides an enclosure that allows ready access for increasing or decreasing the number of splices or rearranging the splices in the enclosure. Enclosures according to the invention can be increased in effective size to accommodate system size increases without disturbing the previously stored splices.

SUMMARY OF THE INVENTION

In accordance with one aspect of the invention, there is provided a housing assembly for enclosing cable splices generally comprising a cylindrical tube closed at one end with a rib structure around its exterior to improve its structural integrity during pressurization and impact testing. An open end incorporates a tapered section on its interior surface to promote the compression of a gasket required to seal the cylindrical tube. Integrated into the perimeter of the open end is a circumferential rib that provides a leverage surface for a collar. An air valve device can be assembled through the exterior of the housing assembly for pressurization of the cylindrical tube once fully assembled.

In accordance with another aspect of the present invention, a collar component is provided including a split design to allow for easier assembly and disassembly in the field. The collar is designed with an asymmetrical U-channel cross section which ensures that the collar can only be assembled in one direction. In one embodiment, a snap latch is provided for securing the collar onto the housing assembly. In another embodiment, an over center snap latch is provided to similarly secure the collar during assembly.

In accordance with a still further aspect of the invention, the cylindrical tube for enclosing and storing cable splices comprises an end plate at the open end and axially spaced from the closed end and defining a storage base therebetween. The end plate includes a segmented design with removable section portions which allow for individual cables to be accessed without disruption to other cables passing through the end plate. The end plate comprises a plurality of cable caps. Each cable cap is attached to the end plate body by threading bolts into weld nuts captured within the end plate body. Each of the cable caps are identical, therefore the location of each cap during assembly is not critical. The bottom surfaces of each of the cable caps have a soft sealing material molded onto them to promote sealing between mating surfaces during assembly. The end plate includes a plurality of cable entry areas which are capable of being blocked by sealing walls when not in use. A variety of cable sizes can be accommodated by the cable entry areas by the use of low durometer compound tape and/or use of a grommet.

In accordance with yet another aspect of the invention, a universal fiber organizer is provided comprising a top organizer bar, a bottom storage bar, a fiber splicing tray, a tray restraint clip, and a fiber storage strap. The top organizer bar serves as the structure to support the fiber splicing trays. The bottom storage bar serves as a floor for storing loose fiber prior to transitioning the fiber into the splicing trays. The splice trays can be individually accessed without disrupting the other trays contained in the enclosure. The volume of space required to store the loose fiber can be enlarged or reduced per the customers requirements and a removably connected design allows for open access to the fiber storage area.

In accordance with yet another aspect of the invention, a tray restraint clip is provided for retaining a fiber splice tray. The geometry of the tray restraint clips are such that the clips can interlock with one another as they are stacked whereby the fiber tray capacity is increased in the enclosure. The clips can also slide together in one direction and small locking bumps are provided for engaging into locking slots which lock adjacent clips together. The locking feature is not permanent and can be overcome if desired in order to remove the clip. The interlocking tray restraint clips allow one to increase or decrease the splicing capacity of the enclosure and allow individual access to each tray.

In accordance with another aspect of the invention, the bottom storage bar provides a storage space for the loose fiber prior to being transitioned up to the splice trays. Integrated into the bottom storage bar is a large U-shaped section with a plurality of holes in the surface to provide for tying down the loose fiber. The walls of the U-section are designed to be flexible to allow for a fiber storage strap to be installed. The fiber storage strap can be located at any of a variety of positions thereby providing variable storage capacity for the loose fiber.

In accordance with still yet another aspect of the invention, a top organizer bar includes slots for retaining the tray restraint clips whereby individual splice trays are retained therein. The top organizer bar further includes a hollow sleeve at each end for sliding engagement with a pair of guide posts vertically extending from the bottom organizer bar. The splice tray assembly can be lifted off of the guide posts allowing a user easy access to the loose fiber storage area below without disruption to the fiber trays and thus minimizing the potential for disruption of data transmission.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, the preferred embodiments and methods of which will be described in detail in the specification and illustrated in the accompanying drawings which form a part hereof, and wherein.

DETAILED DESCRIPTION OF THE PREFERRED EMBODIMENTS

Figure 1:
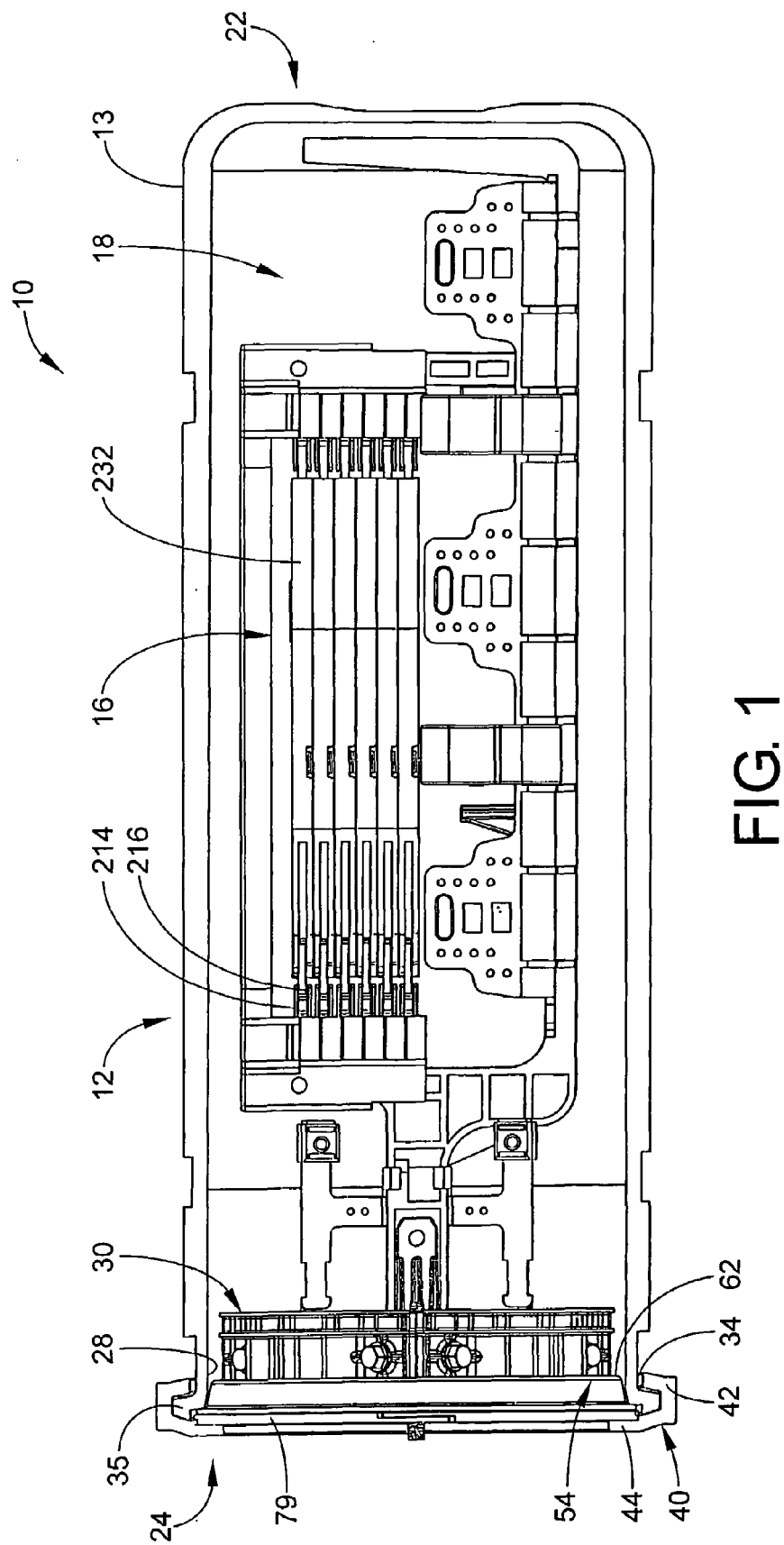
FIG. 1 is a side view of a preferred embodiment of a partial housing assembly along with the universal fiber cable organizer contained therein for use in storing fiber optic cable splices.

Referring now to the drawings wherein the showings are for the purposes of illustrating the preferred embodiments of the invention only and not for purposes of limiting the same, the overall arrangement of the preferred construction of the splice case 10 can best be understood by reference to FIG. 1. As illustrated therein, a main outer housing or dome 12 of splice case 10 comprises a housing enclosure that houses and encloses a splice tray support assembly or fiber organizer 16. The housing 12 is generally formed as a cylindrical tube or domed shell with an interior chamber 18 closed at one end 22 including a rib structure (not illustrated) around its exterior. The housing 12 includes an open end 24 opposite the closed end 22. The open end 24 of the cylindrical tube or housing 12 is closed by a circular end plate member 80 and a collar 40 that is releasably and sealingly engaged with the main housing 12 in a manner to be described hereinafter.

Although the housing 12 body components and the end plate 80 could be formed from a variety of different materials using different manufacturing techniques, in one embodiment, they are preferably injection molded from a suitable plastic containing fibers for reinforcement. One example includes fiber glass filled and reinforced polypropylene.

In the embodiments under consideration, the housing 12 is an elongated, cylindrical configuration defining a tube-like body with a main outer cylindrical wall 13. The main wall 13 is reinforced by outwardly radially extending axially spaced ribs (not illustrated) formed integrally with the wall 13. Each of the ribs extends circumferentially about the wall. In addition to the reinforcing ribs, longitudinally extending ribs (not illustrated) which extend between the axial ends 22, 24 of the housing 12 are selectively provided as needed.

Figure 2A:
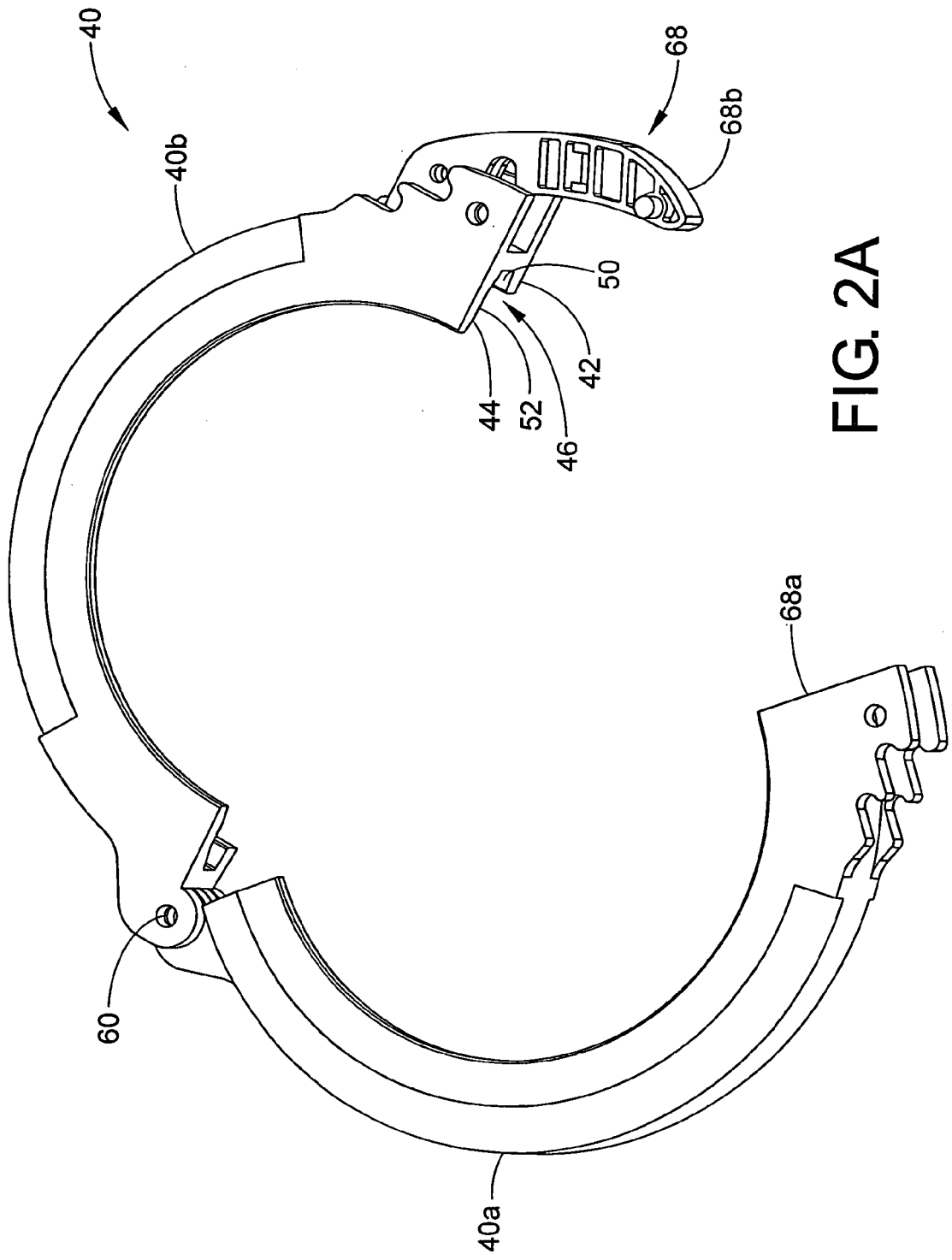
FIG. 2a is an asymmetric view showing a snap latch collar used around the open end of the housing to secure the end plate to the housing.
Figure 2B:
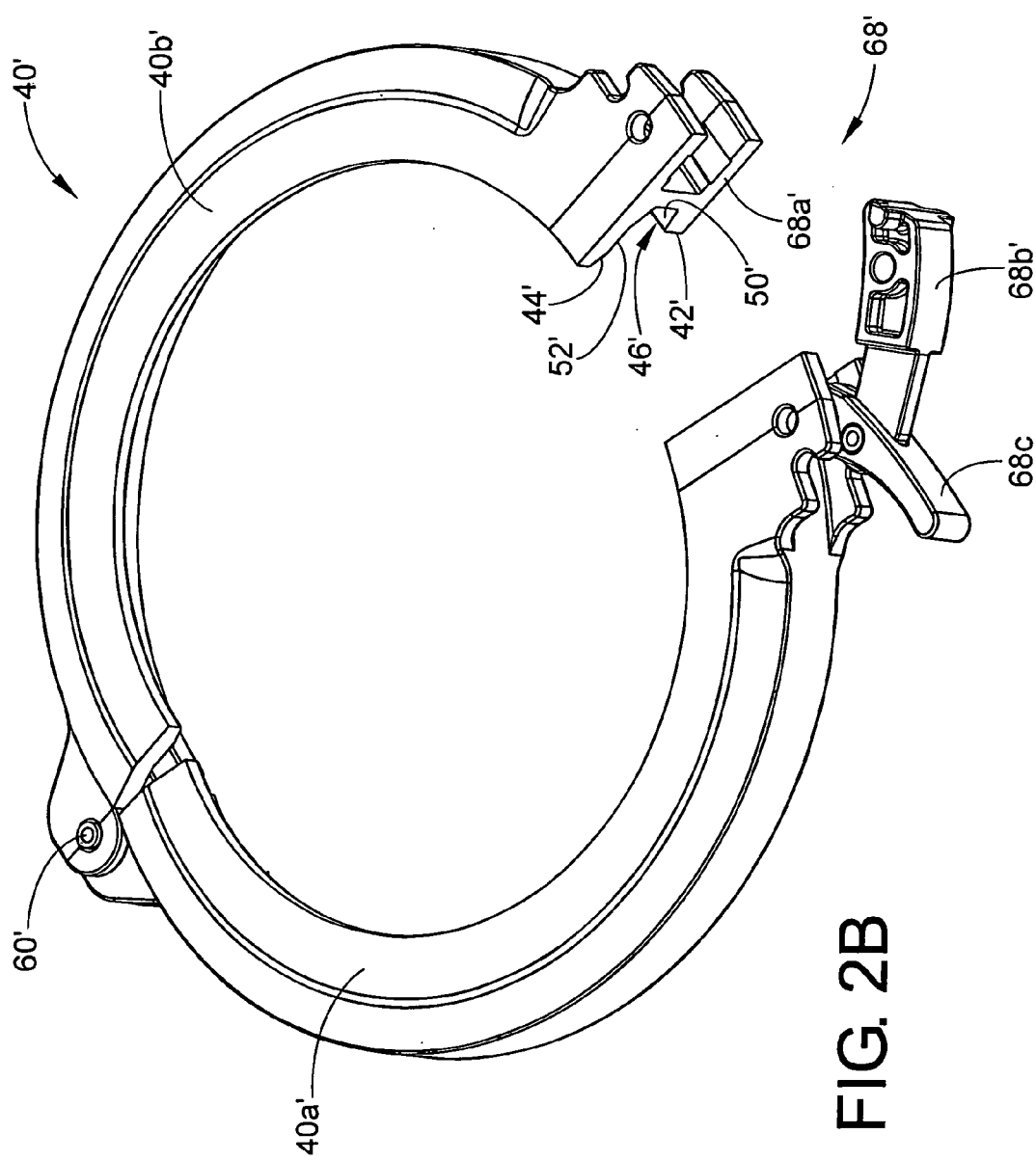
FIG. 2b is an asymmetric view showing an over center latch collar used around the open end of the housing to secure the end plate to the housing.

Integrated into an internal perimeter 28 of the open end 24 of the housing 12 is a circumferential rib 34 that provides a leverage surface for the collar 40. Referring to FIGS. 2a and 2b, the collar 40 generally includes a split design with two sections 40a, 40b to allow for easier assembly and disassembly, particularly in the field. The collar 40 includes an asymmetrical U-channel 46 cross section which ensures the collar 40 can only be assembled in one direction. The U-channel 46 is defined by a short or first leg 42 and a long or second leg 44. The short leg 42 and the long leg 44 each have an inside face 50, 52, respectively. The inside faces 50, 52 each have an angled surface. The two sections 40a, 40b of the collar 40 pivot open and closed about a hinge point 60. As shown in FIG. 1, in the assembled position, the collar 40 is oriented such that the shorter leg 42 of the cross section bears against the circumferential rib 34 of the housing 12 and the longer leg 44 bears against an outside flange 79 of the end plate 80. At opposing ends relative to the hinge point 60, each collar segment 40a, 40b includes an end 68a, 68b, respectively, which form a latch 68 (FIG. 2a) and 68' (FIG. 2b). Specifically, segment 40a includes a female latch portion 68a and segment 40b includes a male latch portion 68b. The latch 68 of FIG. 2a is a simple snap latch construction and the latch 68' of FIG. 2b is an over center type latch construction. The inside faces 50, 52 of the legs 42, 44, respectively form a circumferential pressure surface around the open end 24 of the housing 12. As the open or latch ends 68a, 68b of the collar 40 come close to each other, the female portion 68a of the latch mechanism 68 is extended outward to grab the opposing male segment 68b. The hinged male portion 68b of the latch 68 is then shifted in the opposite direction to lock the collar 40 in place.

Referring now to FIG. 2b, like components are identified by like numerals with a single primed (') suffix and new components are identified with new reference numbers.

In latch 68' of FIG. 2b, a lever member 68c is pivoted inwardly to draw the male end 68b' tight. As the collar 40' is hinged to its closed position, the legs 42', 44' force the end plate 80 into the dome 12, against a tapered surface 35 of the dome's interior. This action sandwiches a gasket 54 between an outer circumferential surface 83 of the end plate 80 and the tapered surface 35 of the dome 12, thus forming a seal. Preferably, the outer surface 83 and the associated gasket 54 are provided with cooperating ribs 86 and grooves 88 to provide increased bonding surface and improve the retention and sealing ability of the gasket 54. In this regard, when the gasket 54 is installed, no use of mastic or adhesive is necessary.

Figure 3:
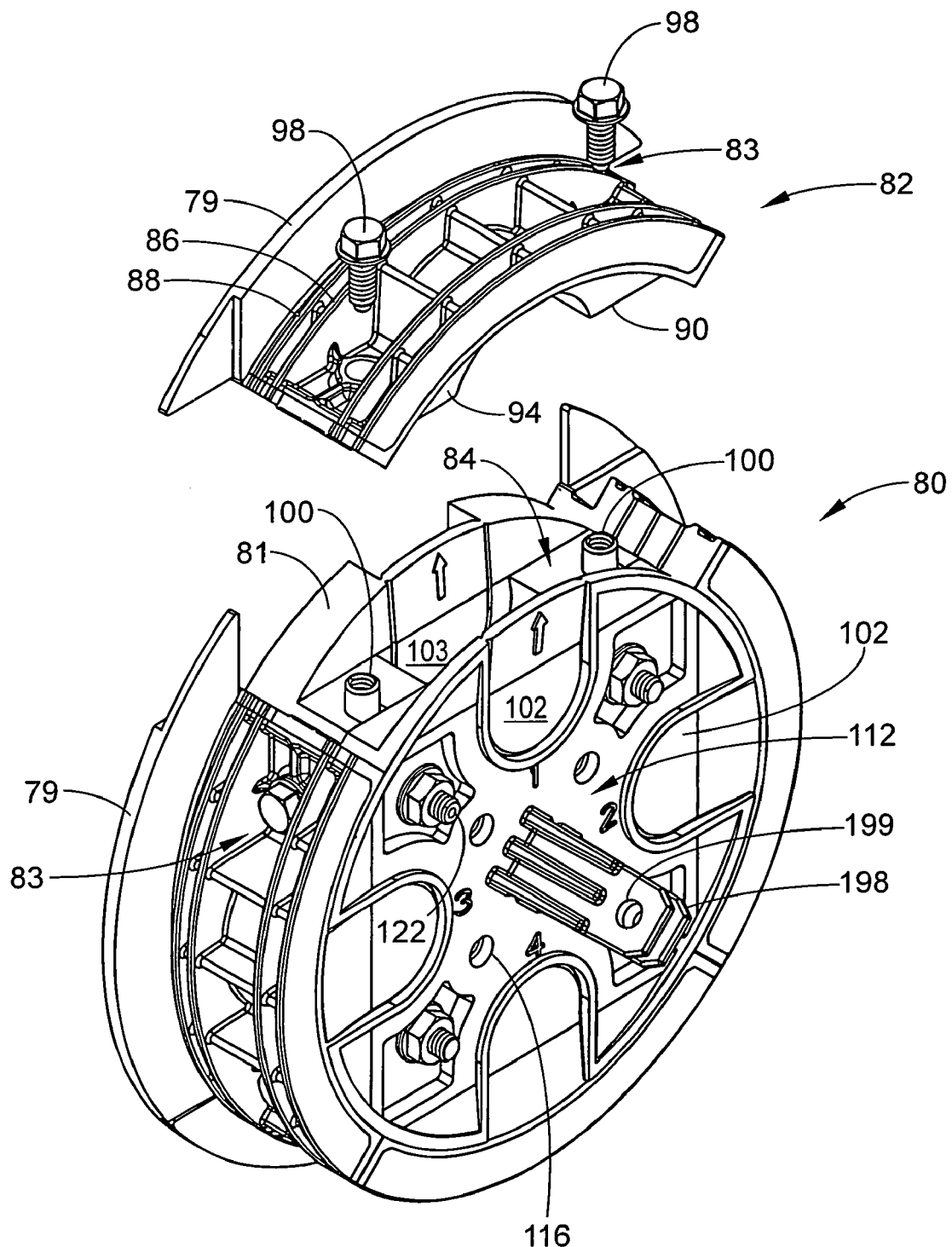
FIG. 3 is an asymmetric view showing the end plate used at the open end of the housing.
Figure 4:
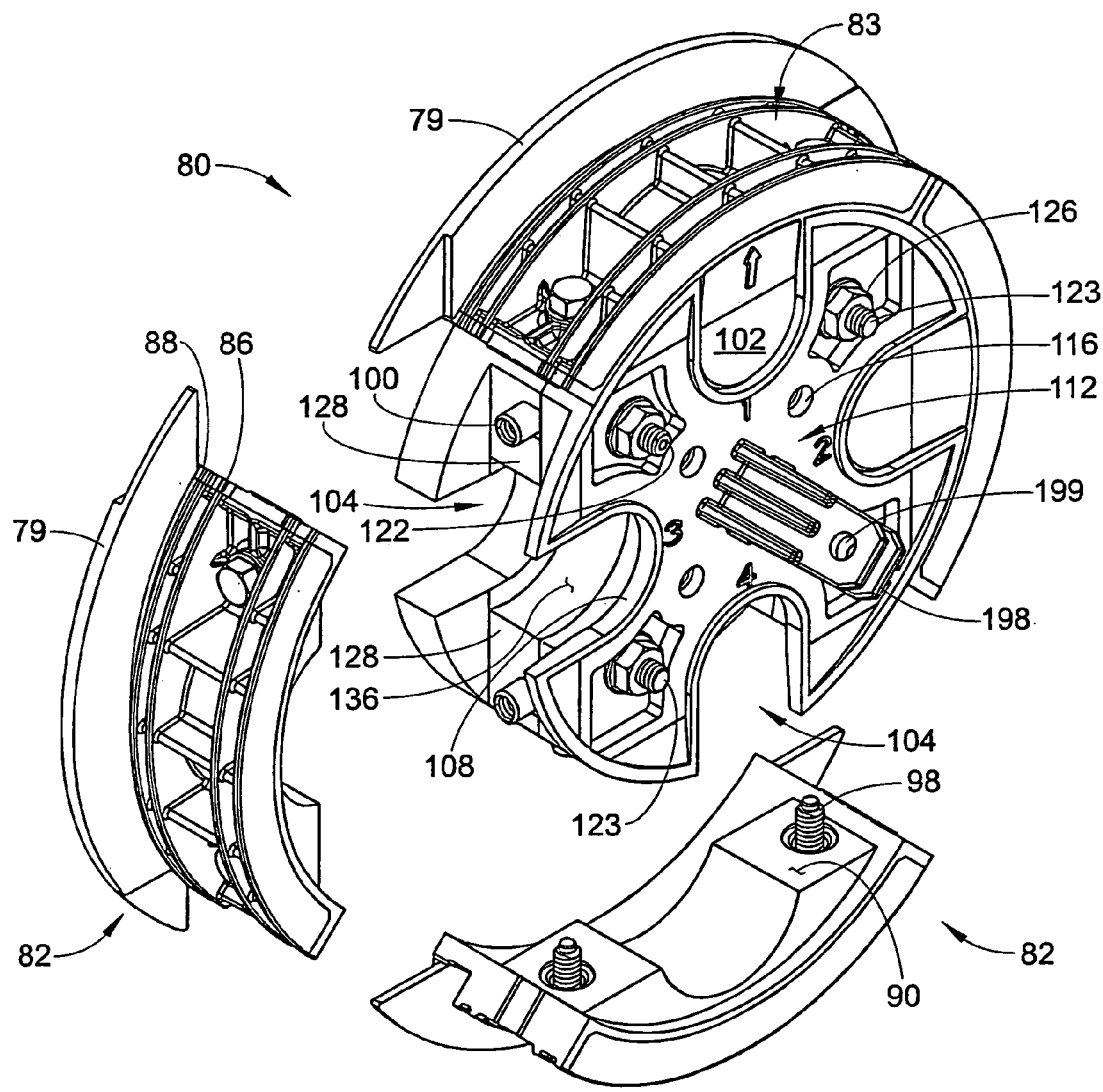
FIG. 4 is an asymmetric view of the end plate showing two end plate caps disengaged.
Figure 5:
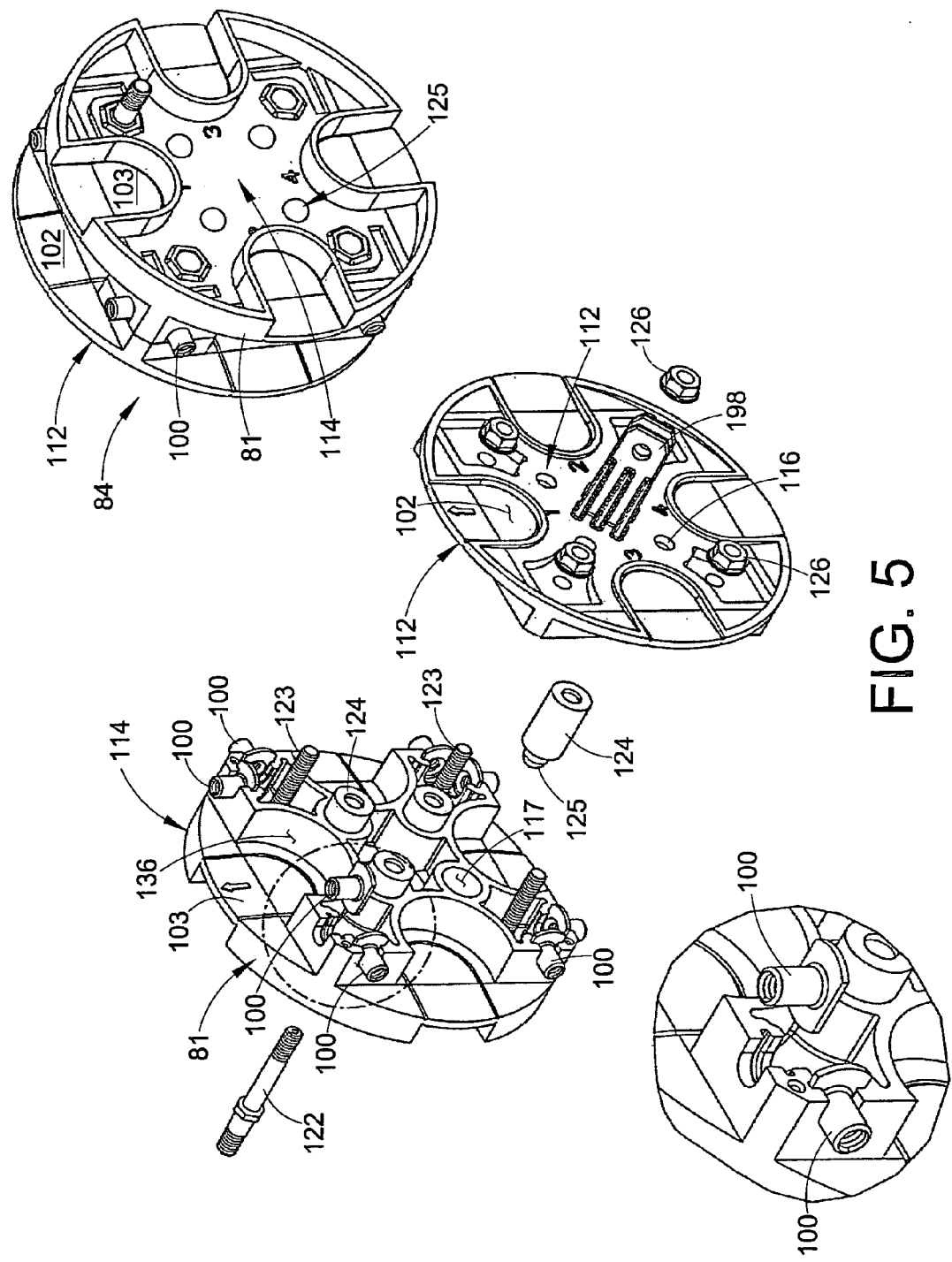
FIG. 5 is an exploded asymmetric view of the end plate of FIG. 4.

Referring now to FIGS. 3–5, the segmented end plate 80 is shown. The end plate 80 is generally a two-part structure comprising a central section or body 84 and an inside face 112 and an outside face 114. As displayed, a plurality of section portions or cable caps 82 are formed in a perimeter around the body 84 of the end plate 80. FIGS. 3–5 display four cable caps 82, but it will be appreciated that any number of cable caps 82 could be utilized depending on the size and application of the housing 12 of splice case 10. The components are molded and assembled in the configuration shown and as described define four cable through openings 104. The openings 104 can be of any desired size, but are preferably all of the same size. It is to be appreciated that the holes must all be the same size to have the ability to use the caps at any location. When this ability or functionality is not necessary, a variety of different sizes of openings 104 can be implemented. In the subject embodiment, however, the four outer openings 104 are of equal size. Additionally, the components are molded and arranged to define four inner through openings 116. Again, the inner openings 116 can be of any desired size, either all of the same size, or a variety of different sizes. In the subject embodiment, the four inner openings 116, albeit smaller than the outer openings 104, are equal in size to each other. Each cable cap 82 is formed in an identical manner thereby simplifying assembly.

The bottom surface 90 of each cable cap 82 has a soft sealing material 94 molded thereon to promote sealing between the bottom surface 90 of the cable cap 82 and a perimeter or outer surface 81 of the end plate body 84. In one embodiment, each cable cap 82 is attached to the end plate body 84 by threading bolts 98 into weld nuts 100 captured within the end plate body 84. Generally each cable cap 82 has an associated sealing wall 102 slidingly engaged with a cable entry area 104 formed in the end plate body 84. Each cable entry area 104 is blocked by a pair of sealing walls 102, 103 whereby the sealing walls 102, 103 serve as a plug when a cable entry 104 is not in use. The cable entry area 104 includes a thin wall section groove 108 molded around the perimeter to allow for the sealing walls 102 to be removed when the cable entry 104 is needed. Similarly, corresponding sealing walls 103 can be removed from the end plate body 84.

Referring to FIG. 4, a pair of cable caps 82 has been removed along with their associated sealing walls 102, 103 thereby providing two openings 104 for cables 106 to pass therethrough.

Referring next to FIG. 5, the end plate body 84 is displayed. The end plate body 84 includes opposing face plates. Specifically an inside face plate 112 and an outside face plate 114 is shown. Additionally, the end plate body 84 includes weld nuts 100, air valve 122, fastening studs 123, a ground wire grommet 124, and nut 126. The fastening studs 123 and air valve 122 serve as alignment posts during assembly of the face plates 112, 114. The fastening studs 123 and air valve 122 further serve as bolts to fasten both face plates 112, 114 together. The air valve 122 can be assembled through the exterior of the housing assembly 10 for pressurization of the cylindrical housing. The air valve device 122 is preferably located on the end plate member 84 of the housing assembly 10, but may be disposed on the cylindrical tube 12 or elsewhere as desired.

Referring again to the end plate 80, it should be understood that the end plate 80 is sized and shaped so as to be closely and tightly received within the open end 24 of the dome housing 12 so as to be sealingly engaged about its outer periphery 83 by the associated gasket 54 portion in the bottom of the recess. The end plate 80 is preferably molded from the same material as the cylindrical tube housing 12. The plate 80 is a segmented molding and is provided with a plurality of segmented cable caps 82 around the periphery 81 each having a plurality of outwardly extending sealing ribs 86, 88 formed thereabout. Ribs 86, 88 are arranged to sealingly engage with the gasket 54.

Figure 6:
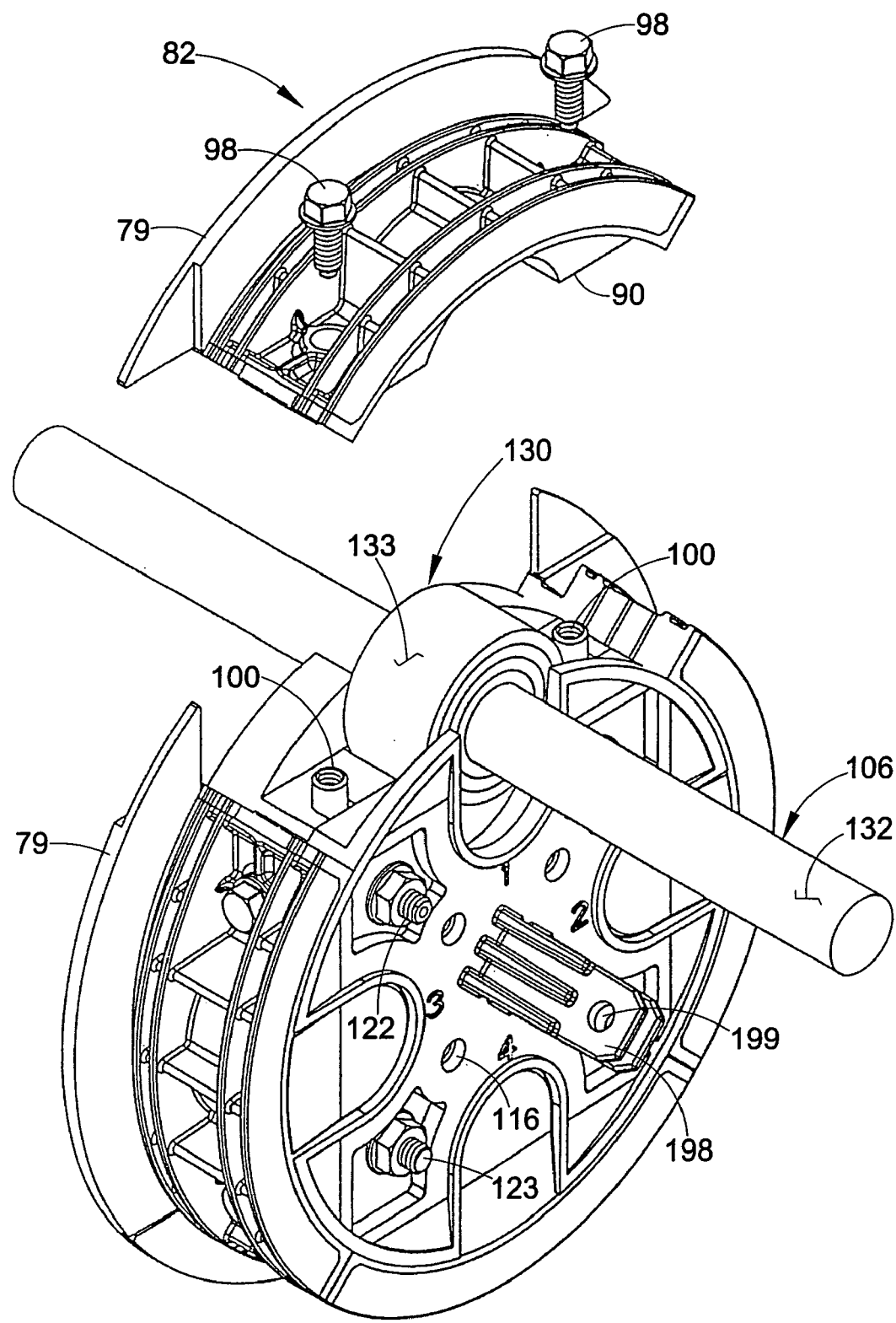
FIG. 6 is an asymmetric view of the end plate with the end plate cap removed with a cable passing through one cable entry.

Referring to FIG. 6, sealing walls 102, 103 have been removed and a cable 106 is displayed passing therethrough. It is appreciated that a plurality of cables 106 may be located in the cable entry openings 104 left by the removal of the sealing walls 102, 103. Different diameters of cables 106 are accommodated by the use of, for example, tape 130 which is wrapped around the circumference 132 of the cable 106. Specifically, a sealing arrangement is accomplished by wrapping the tape 130 (i.e. a low durometer compound, wrapping, gel material, rubber compounds, etc.) around the outer perimeter 132 of the cable 106 a sufficient number of times in order to build up a circumference 133 of the cable 106 and tape 130 combination. The tape 130 is of generally the same width as a trough 136 provided by the sealing surface 128 between the inside 112 and outside 114 faces of the end plate 80. This buildup of the cable 106 and tape 130 creates interference when the enlarged circumference 133 is installed between the face plates 112, 114. Once the cable 106 has been seated into the opening 104 between the face plates 112, 114, an end plate cap 82 is drawn down against the cable 106 and tape 130 assembly whereby the compliant nature of the tape 130 promotes sealing around the mating surfaces.

Figure 7A:
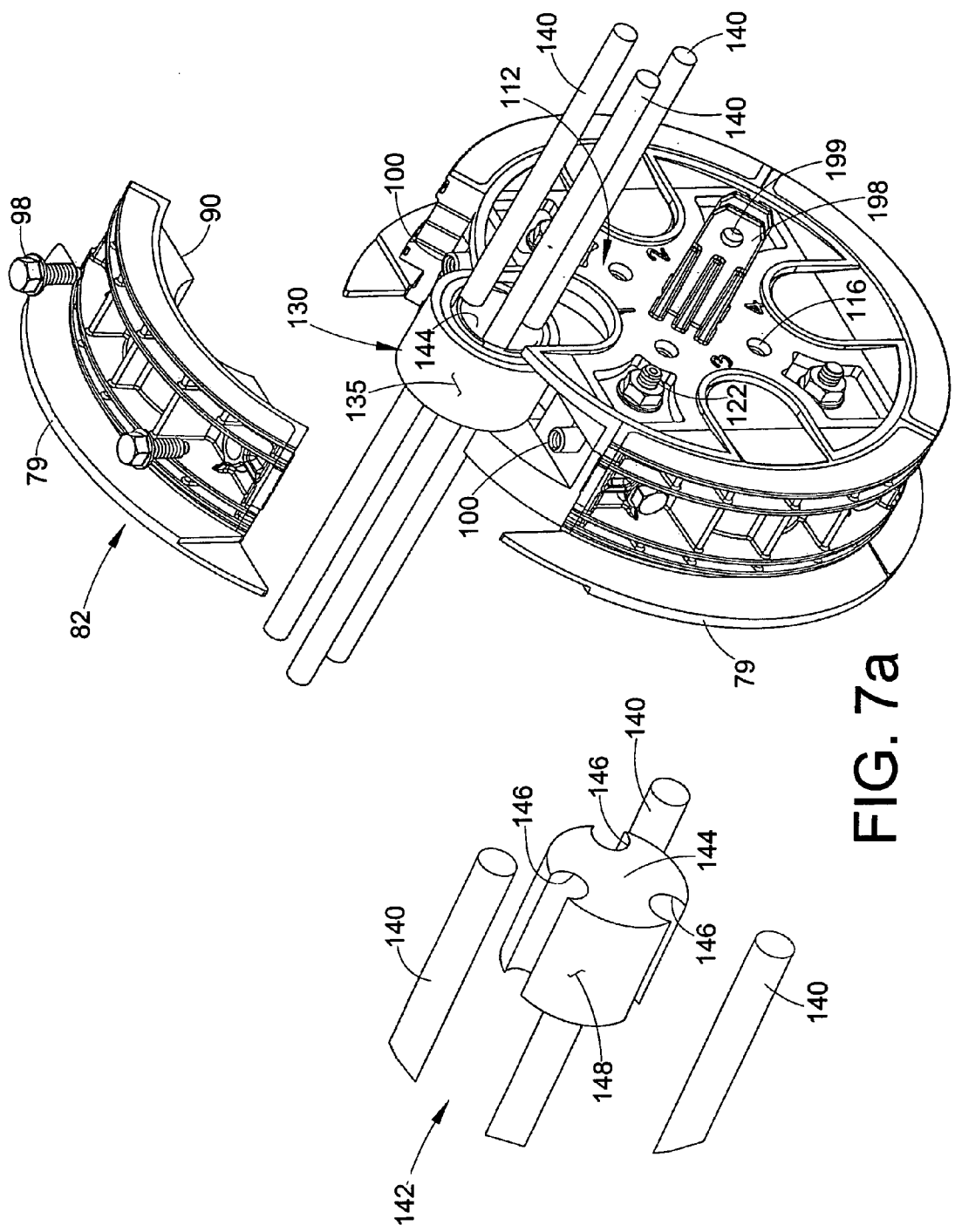
FIG. 7a is an asymmetric view of the end plate with a set of smaller cables passing through one cable entry and supported by a slotted grommet.
Figure 7B:
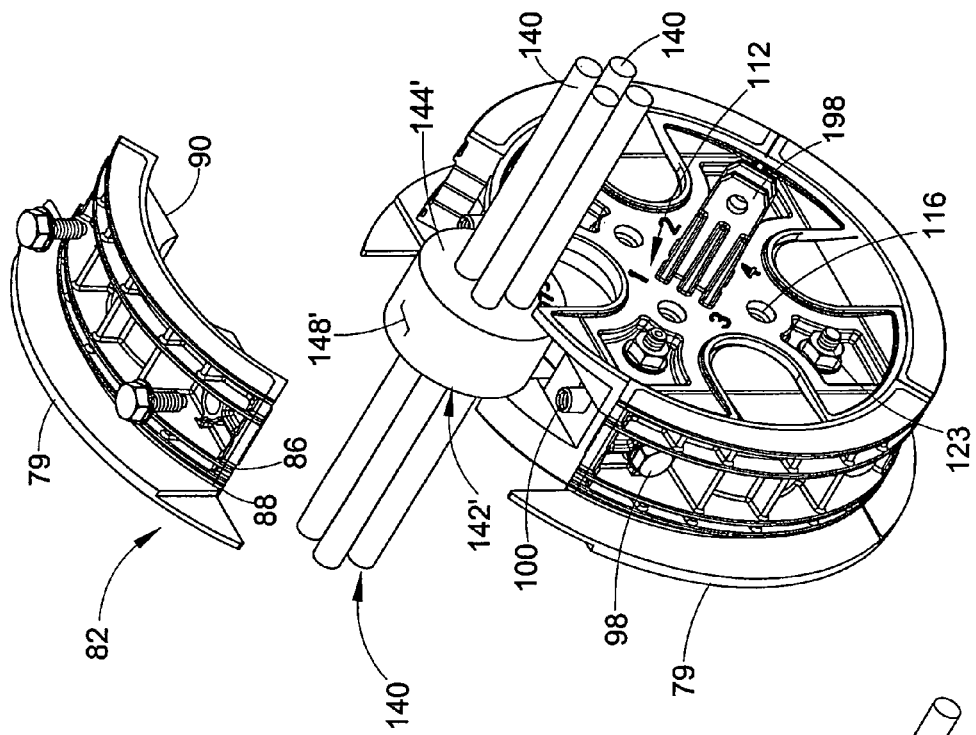
FIG. 7b is an asymmetric view of the end plate with a set of smaller cables passing through one cable entry and supported by a grommet having a corresponding set of axial through holes adapted to received the cables.
Figure 7B:
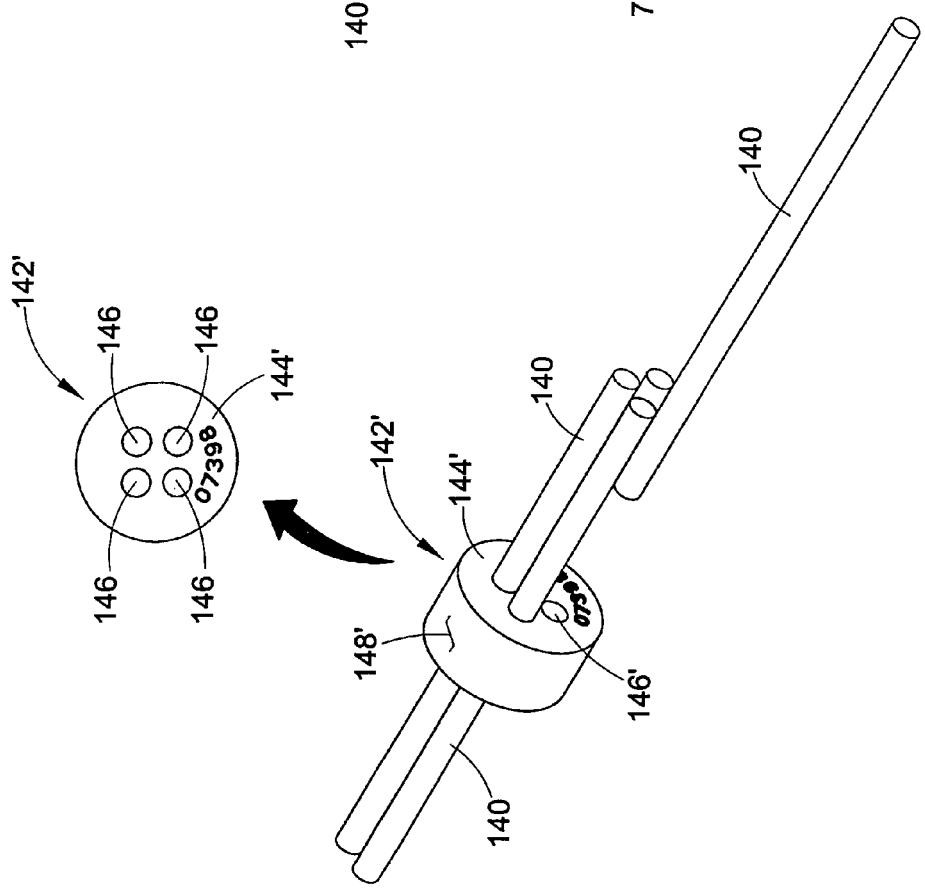

Smaller diameter cables 140 (i.e. less than 0.50 inches) may be installed with the use of grommet systems 142, 142' as shown in FIGS. 7a and 7b. The grommets 142, 142' include a central grommet hub 144, 144' constructed, for example, of a low durometer compound. As shown in FIG. 7a, a first grommet type 142 contains a series of slots or cable openings 146, cut out of a perimeter 148 of the grommet 142. Each slot 146 accepts a range of cable diameters. Any number of slots may be cut into the perimeter 148 of the grommet 142 and the corresponding number of cables 140 are inserted therethrough. Slots 146 that do not contain a cable 140 may include a rod or similar item (not illustrated) installed to act as a plug. It will be appreciated that the plugs can be removed at a later date in order to allow additional cables 140 to pass through the grommet 142 and cable opening 146. Once all of the cables 140 have been inserted around the perimeter 148 of the grommet 142, the low durometer tape 130, for example, is wrapped around the perimeter 148 of the grommet 142 and cables 140 until a proper outer circumference 135 is achieved. This assembly is then placed between the end plates 112, 114 similar to a single cable 106 as shown in FIG. 6.

A second grommet type 142' is shown in FIG. 7b. The grommet 142' is constricted of a low durometer compound and contains a series of holes or cable openings 146' through the hub 144' area defined by the perimeter of grommet 142'. Each opening 146' accepts a range of cable diameters. Any number of openings may be formed axially through the grommet 142' and the corresponding number of cables 140 are inserted therethrough. Openings 146' that do not contain a cable 140 may include a rod or similar item (not illustrated) installed to act as a plug. It will be appreciated that the plugs can be removed at a later date in order to allow additional cables 140 to pass through the grommet 142' and cable opening 146'. After all of the cables 140 have been inserted into the grommet 142', the assembly is then placed between the end plates 112, 114 and a cable cap 82 is installed to seal around the circumference of the grommet. It is to be appreciated that the low durometer tape 130 can be wrapped around a perimeter 148' of the grommet 142' to build up the outer circumference if desired (not illustrated).

Figure 8:
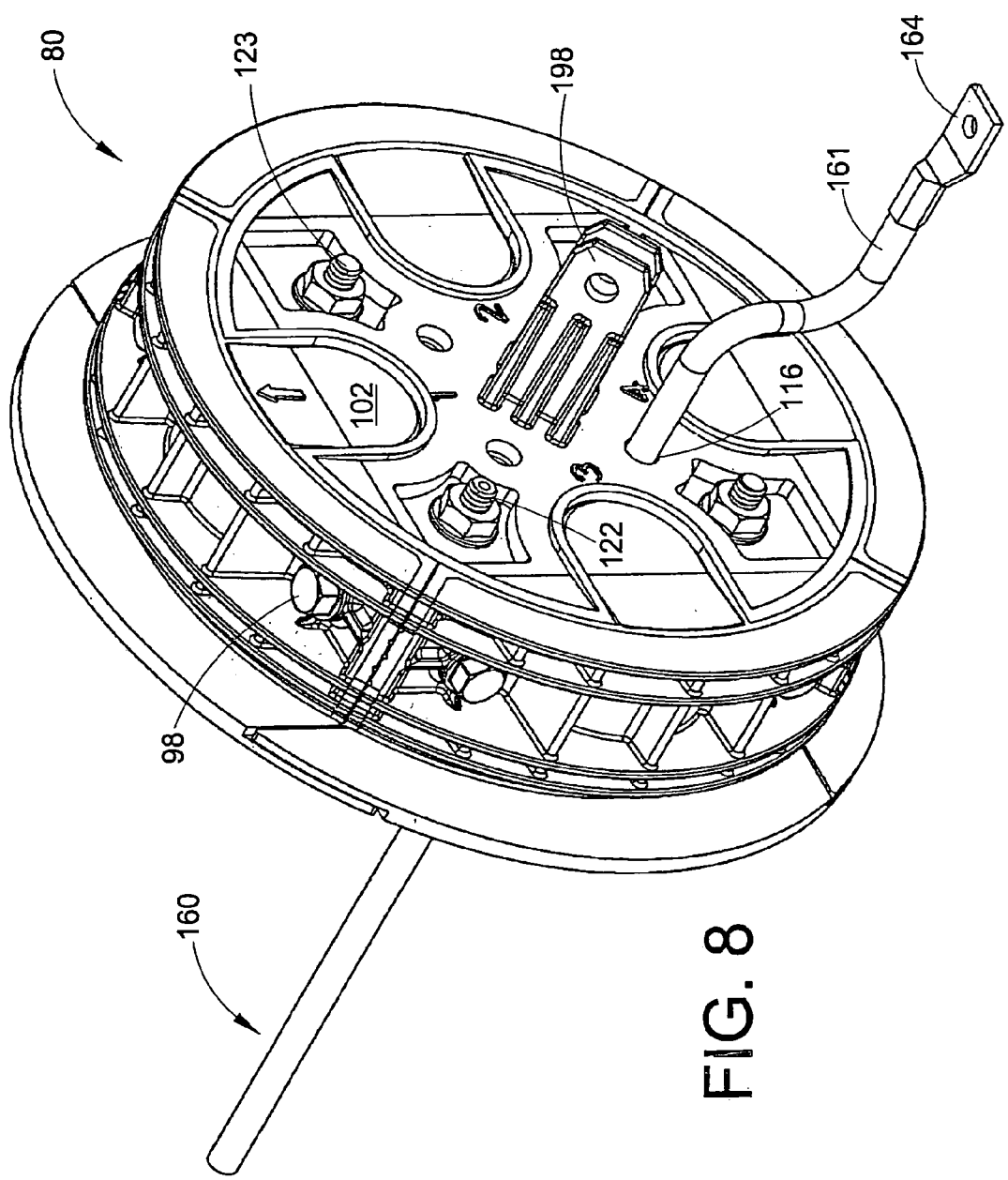
FIG. 8 is an asymmetric view of the end plate showing a ground wire passing therethrough.
Figure 9:
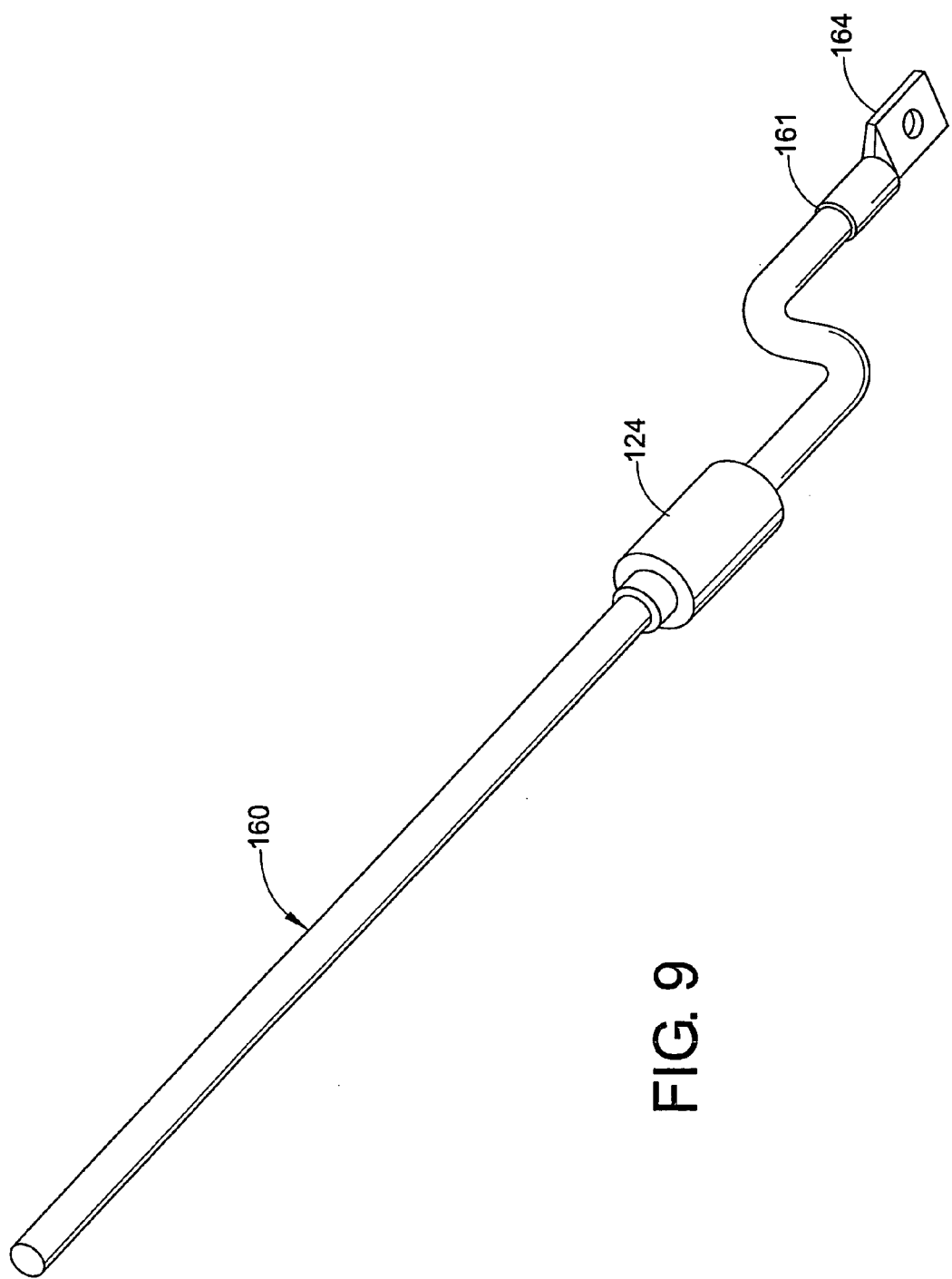
FIG. 9 is an asymmetric view of the ground wire along with a ground wire grommet.
Figure 10:
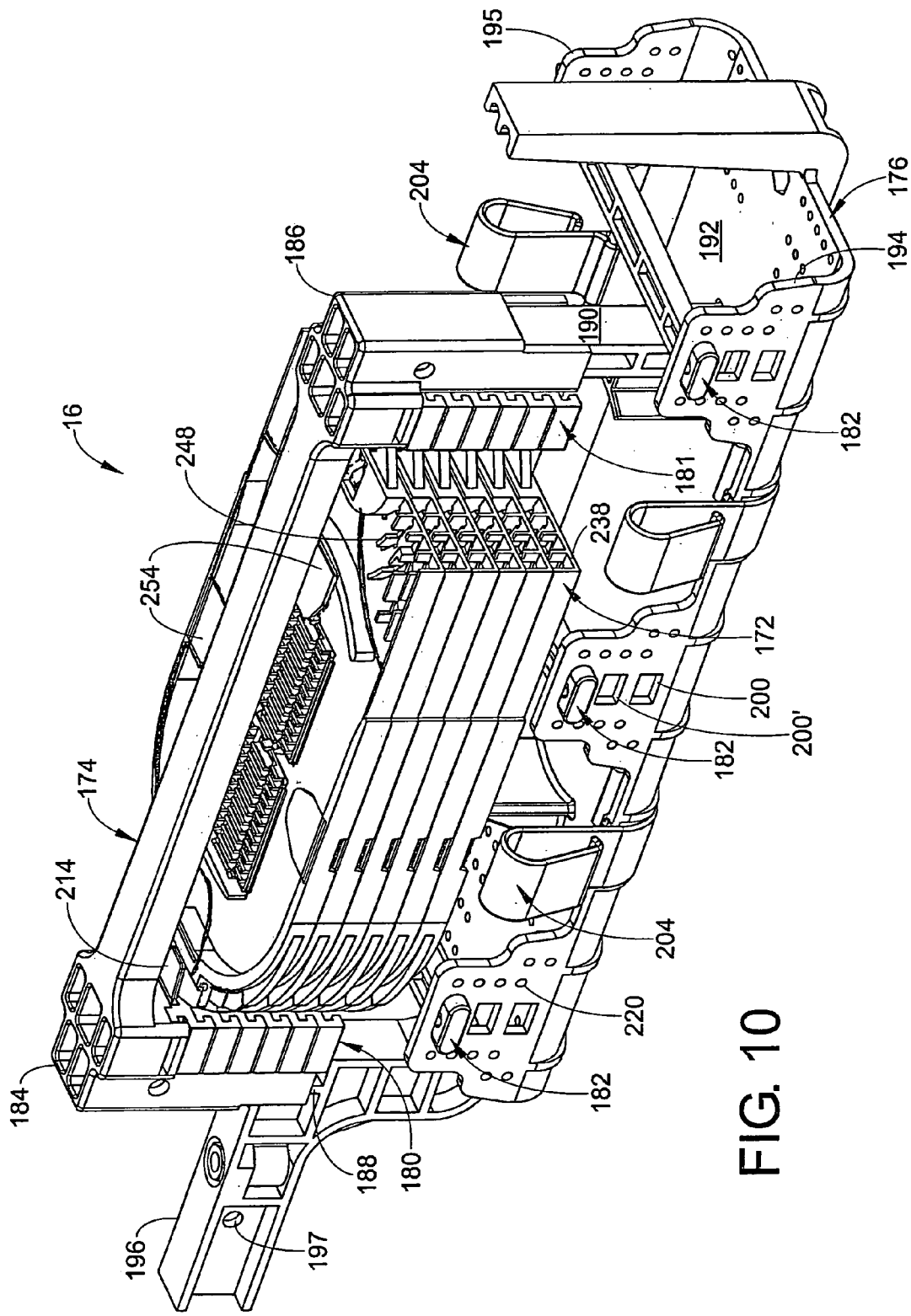
FIG. 10 is an asymmetric view of a universal fiber organizer in accordance with a first embodiment of the subject fiber closure system.

As shown in FIGS. 8 and 9, an independent and isolated ground wire 160 may be passed through one or more of the inner openings 116. A ground wire grommet 124 is sized to surround the insulated ground wire 160. The ground wire grommet 124 is retained in an associated opening 117 in the outer plate 114, as shown in FIG. 5. The grommet 124 includes a piercable tip 125. The piercable tip 125 projects outward from the outer plate 114 when the grommet 124 is installed (see FIG. 5). The inside end 161 of the ground wire 160 includes a connection 164 which can be attached to a cable strength member bracket 170 (shown in FIG. 11). The inner openings 116 that do not contain a ground wire 160 or other wire may include a rod or a similar item (not illustrated) installed to act as a plug.

Figure 17:
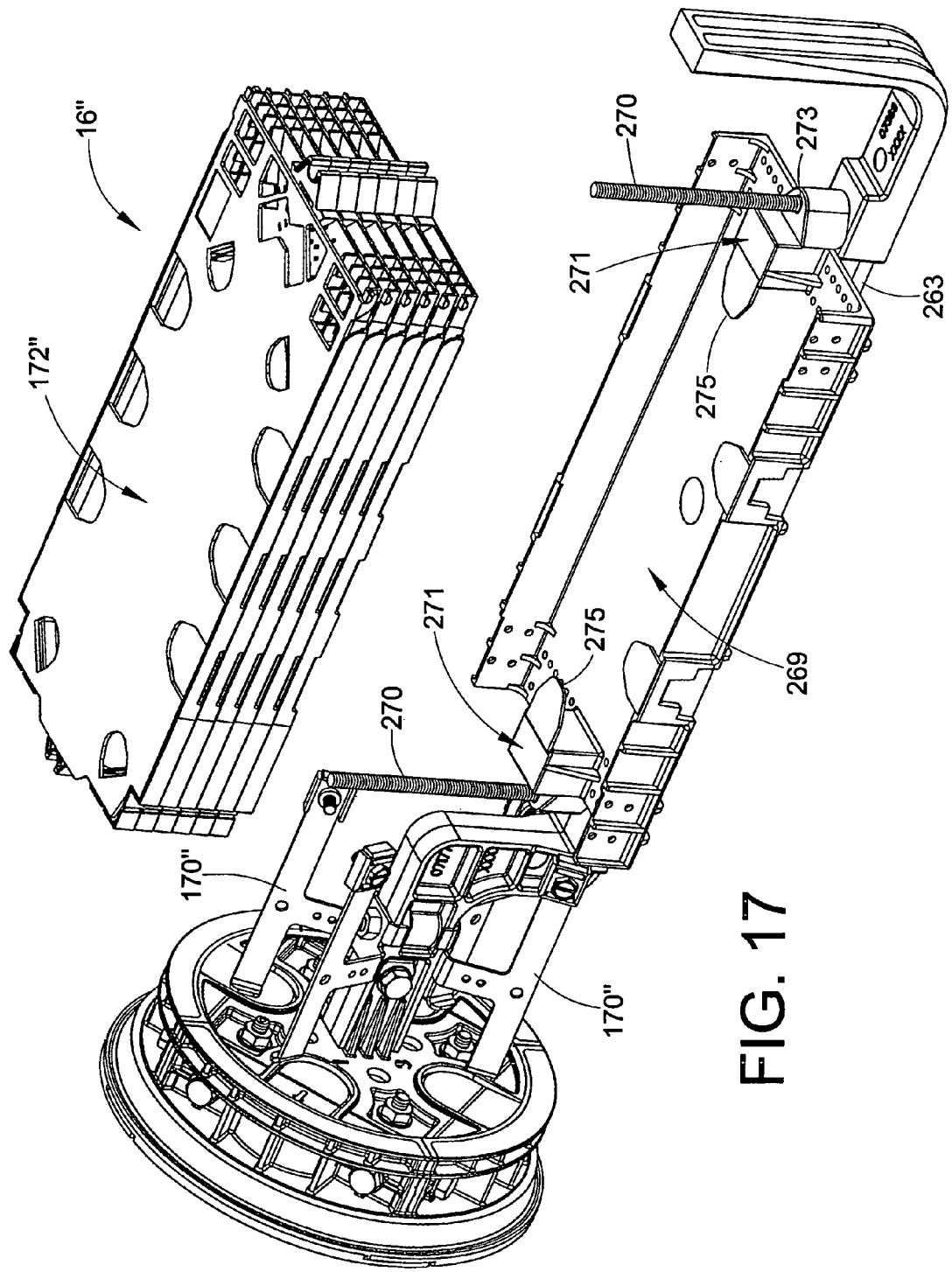
FIG. 17 is an asymmetric view of a unitube organizer used in the cylindrical housing in accordance with another embodiment of the subject fiber closure system; and, FIG. 18 is a view of the unitube organizer of FIG. 17 shown with the set of splice trays received on the bottom transition compartment tray.
Figure 18:
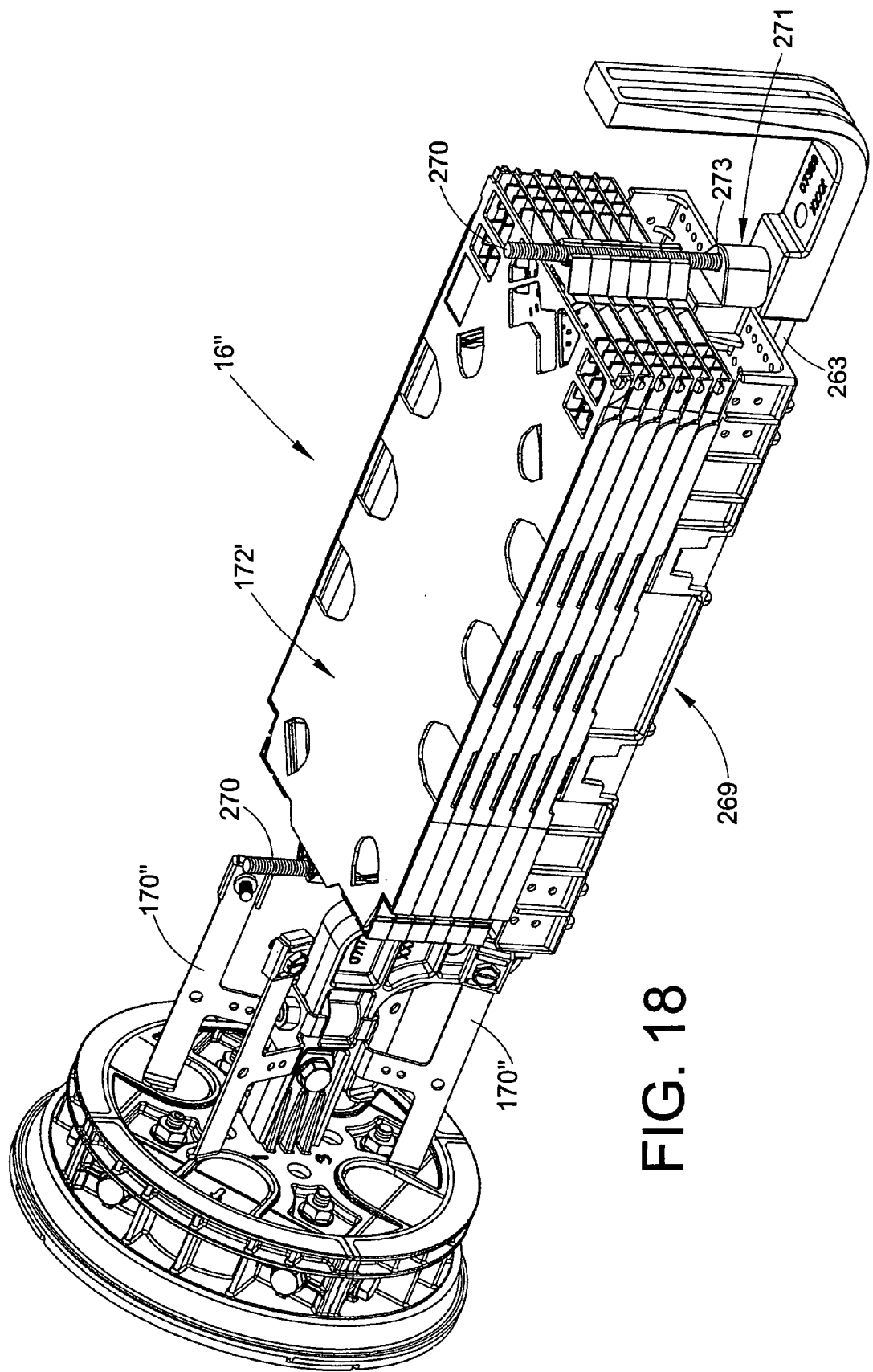

As previously mentioned, mounted within the chamber 18 is a tray support assembly 16 or universal fiber organizer that carries one or more splicing trays 172 and also makes provision for storage of excess cable. The preferred form of the universal fiber organizer is shown in FIGS. 1 and 10–14. A buffer tube organizer 16' is shown in FIGS. 17 and 18. With reference first to FIGS. 1 and 10–14, the preferred form of universal tray support assembly 16 is intended for use with buffered cable unitube and ribbon fiber cables and relies on brackets that provide an open space below fiber splicing trays 172 for storage of excess lengths of cable. The fiber organizer 16 includes a top organizer bar 174, a bottom storage bar 176, fiber splicing trays 172, tray restraint clips 180, 181 and fiber storage straps 182. The top organizer bar 174 includes hollow sleeves 184, 186 at each end which are rigidly joined in alignment and spaced apart relationship to a pair of guide post members or support rods 188, 190, respectively, that extend upward from the bottom storage bar 176. The pair of guide posts 188, 190 form a part of the bottom storage bar 176. The joined arrangement combines the fiber organizer 16 into an independent, rigid, subassembly that does not depend on the outer housing 12 members for its structural strength and integrity. The importance of this arrangement will subsequently become apparent.

Figure 11:
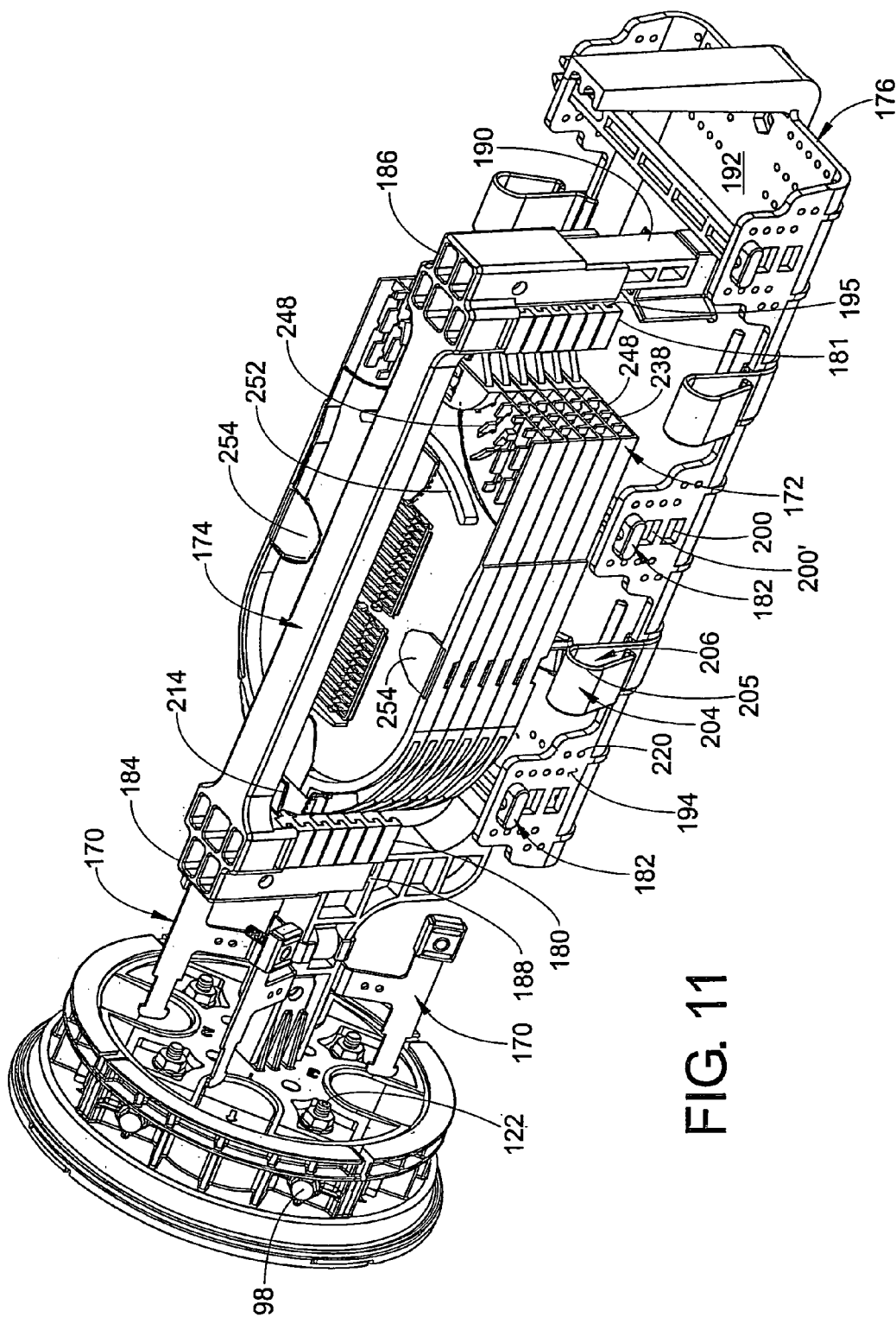
FIG. 11 is an asymmetric view of the universal fiber organizer of FIG. 10 connected to the end plate.

As best seen in FIG. 11, it should be noted that each cable entry opening 104 has a cable strength member bracket 170 associated therewith. To explain the function of the strength member brackets 170, each fiber optic cable 106 generally carries an elongated wire-like strength member (not illustrated) intended to add strength to the cables 106 or, more accurately, to the fiber transport tube within the cable. The strength members are cut away from the transport tubes after the cables pass into the housing 12. In order to anchor the cables 106 to the closure, it is necessary to affix the strength members to the strength member brackets 170. Further, because the strength members expand and contract at a different rate than the fibers themselves, it is important that the movements of the strength member not be transmitted to the splices or the fibers. The strength member connecting brackets 170 thus serve not only to firmly anchor the cables 106 to the housing 12, but also to isolate the splices and fibers from movements caused by expansion and contraction of the strength member.

Figure 12:
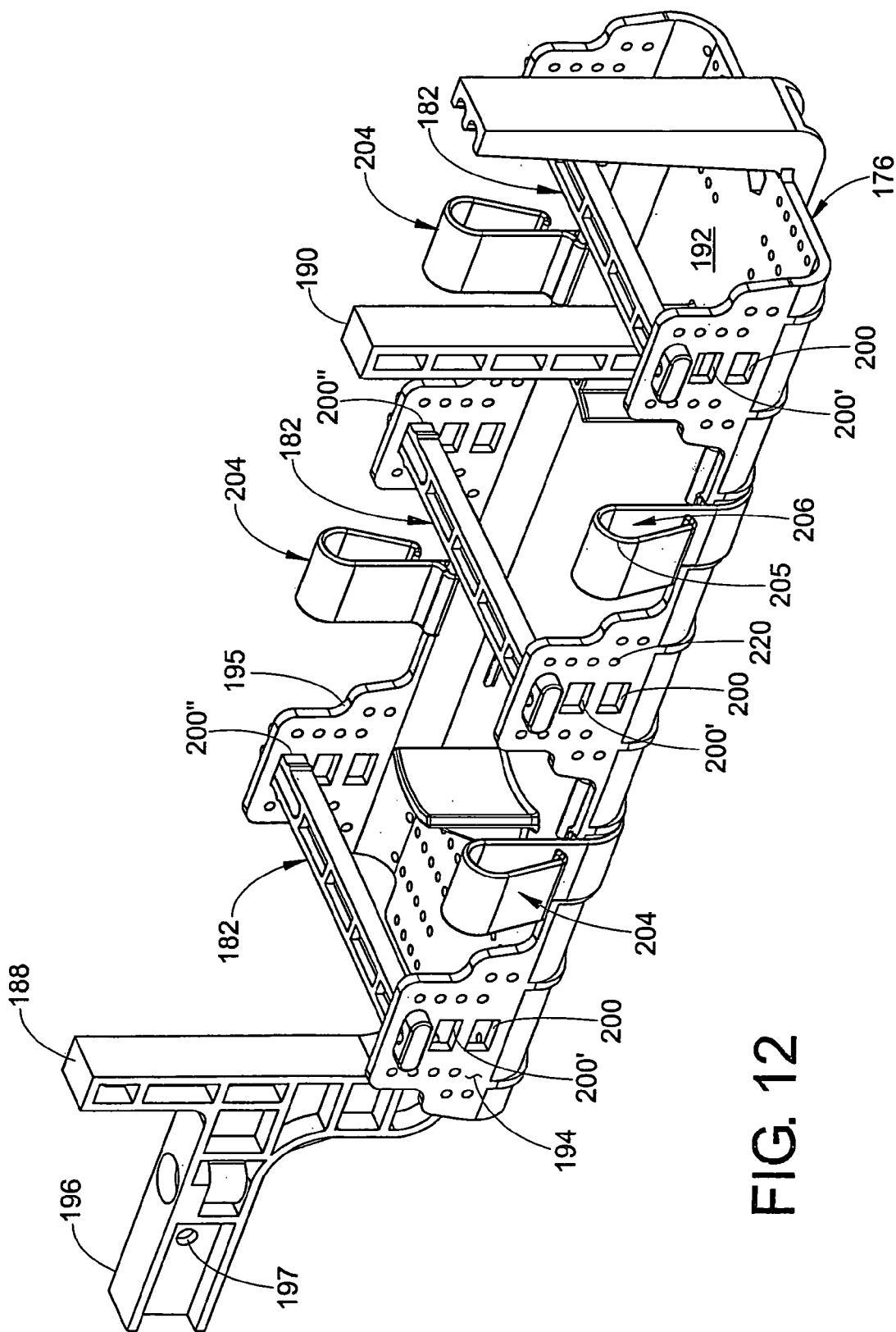
FIG. 12 is an asymmetric view of the bottom storage bar of the universal fiber organizer of FIG. 10.

As best seen in FIG. 12, the bottom storage bar 176 includes a bottom wall 192 and upwardly extending side walls 194, 195. As discussed, the bottom storage bar 176 has a pair of vertically extending guide posts 188, 190. The front guide post 188 includes a mounting post 196 extending transverse thereto. The mounting post 196 connects to a retaining clip 198 extending transverse to the inside face 112 of the end plate 80. The retaining clip 198 has a hole 199 passing therethrough and the mounting post 196 has a corresponding hole 197 passing through, respectively. In the mounted position, the corresponding holes 197, 199 align and may receive a pin or bolt (not illustrated) to secure mounting of the end plate 80 to the bottom storage bar 176. The bottom storage bar 176 also includes a rear guide post 190. The side walls 194, 195 include openings 200 therethrough aligned such that opposing side walls 194, 195 have corresponding openings 200. The openings 200 are configured to receive fiber storage straps 182 which may be raised or lowered depending on which openings 200 the fiber storage straps 182 are mounted in. As shown in FIGS. 10–14, the side walls 194, 195 include three levels of openings 200, 200', 200" passing therethrough, each level representing a different height for mounting the fiber storage strap 182. It will be appreciated that the side walls 194, 195 could include a variety of openings to provide a larger range of height adjustment with respect to the fiber storage straps 182. As shown in FIG. 12, the fiber storage straps 182 are mounted in the uppermost series of openings 200". Adjacent the side walls 194, 195 there are a plurality of fiber organizer clips 204 retained thereon. The fiber organizer clips 204 each have an outwardly curved leg 205 forming an opening 206 therein. The fiber organizer clips 204 and the fiber storage straps 182 work in conjunction for retaining excess lengths of cable. As shown in FIGS. 10–14, the fiber storage straps 182 are in the highest position thereby maximizing the storage capacity between the bottom wall 192 of the bottom storage bar 176 and the mounted fiber storage straps 182.

Figure 13:
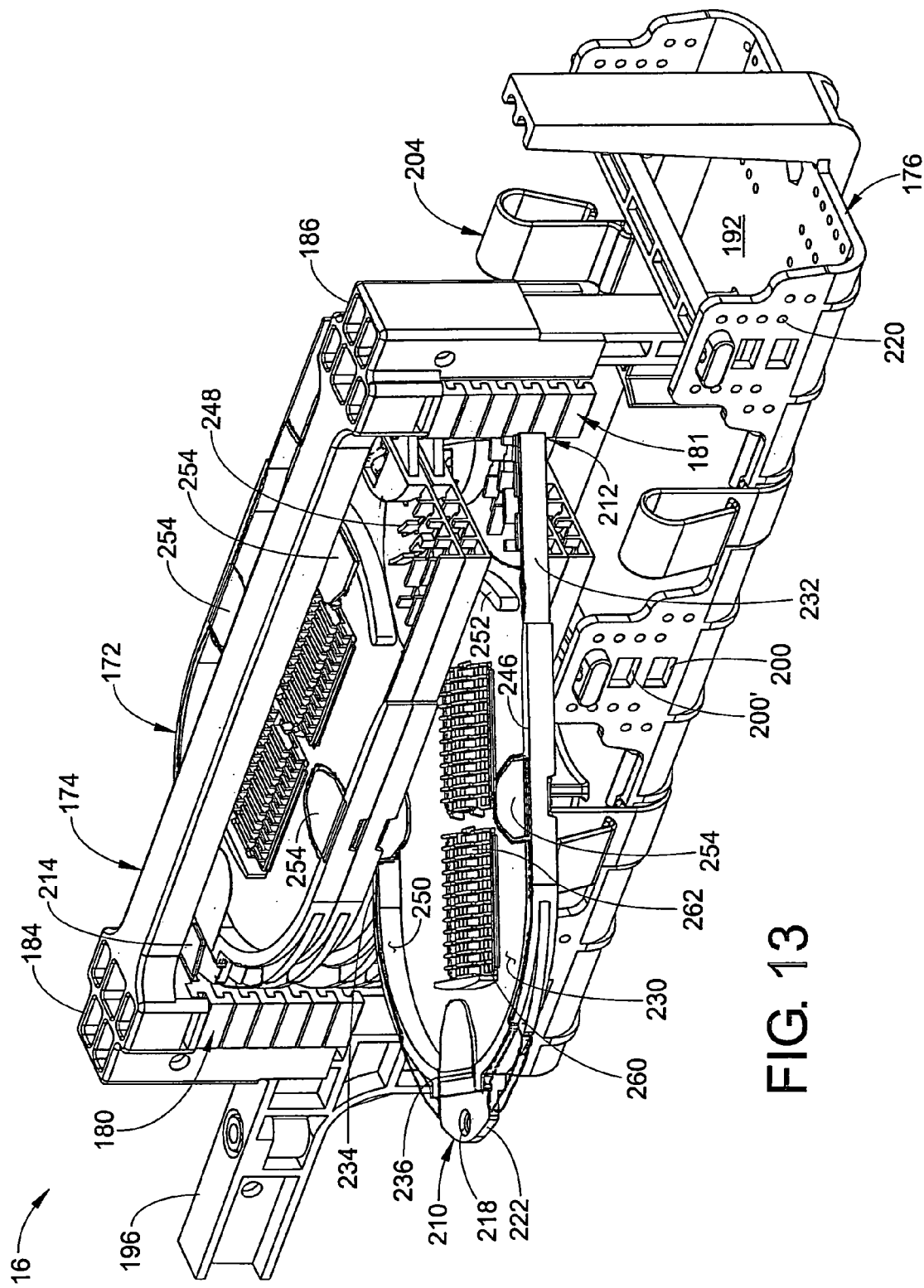
FIG. 13 is an asymmetric view of the universal fiber organizer of FIG. 10 with one fiber splicing tray rotated outward for access thereto; and, FIG. 14 is an exploded asymmetric view of the universal fiber organizer of FIG. 10 showing the fiber splicing trays and top organizer bar removed from the bottom storage bar.
Figure 14:
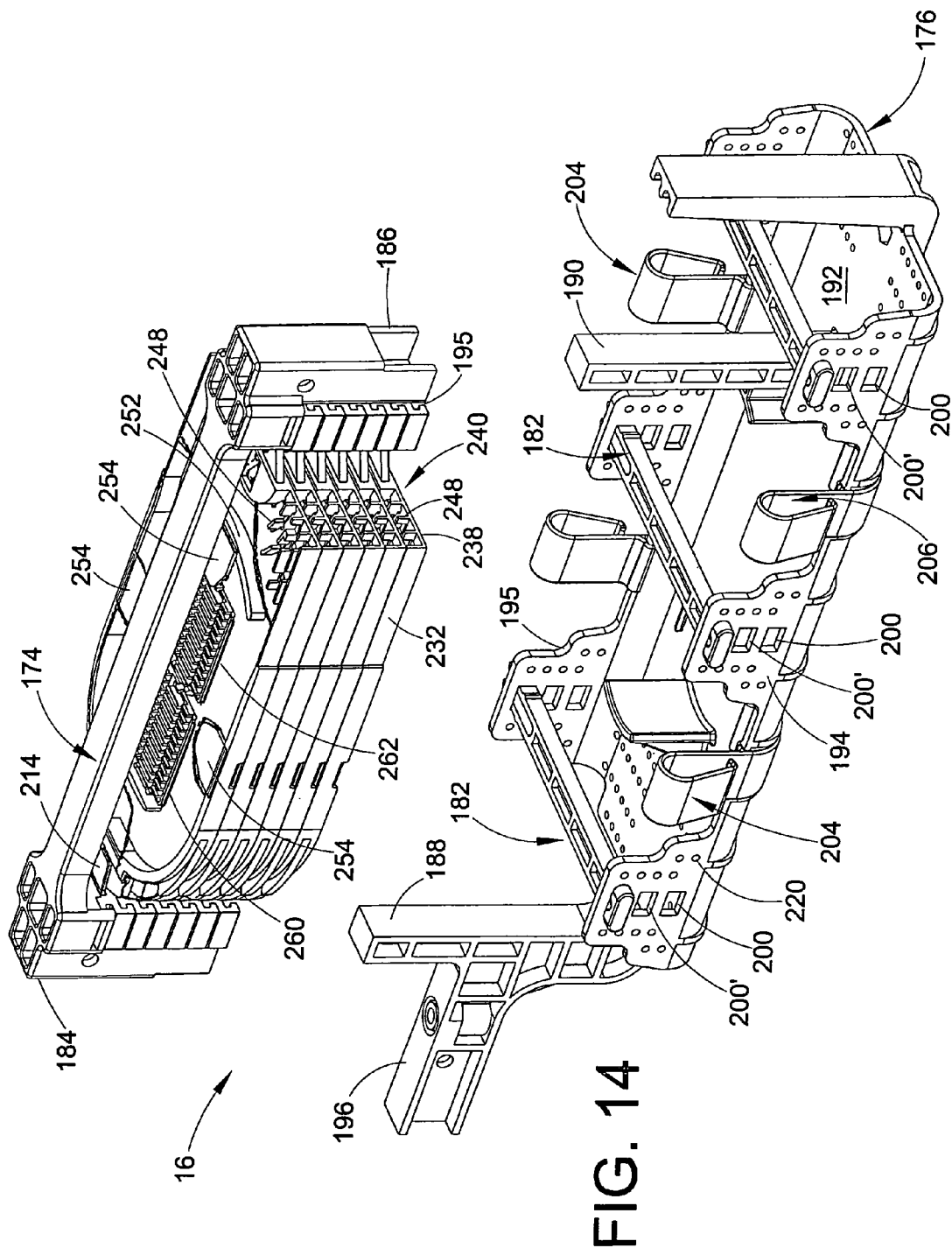

As previously mentioned, the universal fiber organizer system 16 includes one or more fiber splicing trays 172 and also makes provision for storage of excess cable. The form as shown in FIGS. 10–14 is intended for use with any type of cable including buffered cable and relies on the fiber organizer clips 204 and the fiber storage straps 182 to provide an open space under the trays 172 for storage of excess lengths of cable. The top organizer bar 174 includes opposing hollow sleeves 184, 186 extending downward transverse thereto. The hollow sleeves 184, 186 are configured to receive the guide posts 188, 190 extending upward from the bottom wall 192 of the bottom storage bar 176. The hollow sleeves 184, 186 also include retention slots 195 for receiving a plurality of tray restraint clips 180, 181. As shown in FIGS. 10–14, each fiber splicing tray 172 includes an associated pair of tray restraining clips 180, 181. A first clip 180 is attached at the front end 210 of the fiber splicing tray 172 and a second clip 181 is connected to the rear end 212 of the fiber splicing tray 172. The tray restraint clips 180, 181 are configured such that the clips can interlock with one another as they are stacked to increase fiber tray 172 capacity in the fiber organizer system 16. The clips 180, 181, for example, may slide together in one direction and include small locking bumps (not illustrated) which engage into a locking slot contained on an adjacent restraint clip which locks the adjacent clips 180, 181 together. The locking feature is not permanent and can be overcome if the user desires to remove the clip. A pair of flexible walls 214, 216 are contained on one side of the front restraint clip 180 and incorporate a circular protrusion (not illustrated) which provides interference with the mating feature 218 (i.e. indentation, hole, etc.) on an associated fiber tray 172. To install a fiber splicing tray 172, the user forces an end tang 222 of the tray 172 between the two flexible walls 214, 216 (FIG. 1) of the front restraint clip 180. The circular protrusion on the front restraint clip 180 causes the flexible walls 214, 216 to bend outward to provide room for the tray 172. The tray 172 is pressed into the restraint clip 180 until the circular protrusion becomes engaged into the locking hole 218 of the associated fiber tray 172. It will be appreciated that if the application requires more than one fiber splicing tray 172, additional tray restraint clips 180, 181 can be interlocked onto the existing clips 180, 181 to increase the splicing capacity of the closure without disruption of other splice trays 172 in the system. FIGS. 10–14 display a fiber organizer system 16 with six fiber splicing trays 172 installed. As described, a user can easily increase or decrease the splicing capacity of the closure using the interlocking tray restraint clips 180, 181. Additionally, each splice tray 172 is individually accessible. As best shown in FIG. 14, the top organizer bar 174 and the fiber splicing trays 172 can rise vertically from the guide posts 188, 190 and can be removed completely, thereby allowing access to the storage area below. As previously discussed, the bottom storage bar 176 provides the storage space for the loose fiber prior to being transitioned up to the splice trays 172. The side walls 194, 195 include a plurality of holes 220 therethrough which provide a means for tying down the loose fiber. In this arrangement, as mentioned above, the storage tray 172 is intended to maintain and provide a place where extra lengths of, for example, unitube type, optical cable can be coiled and retained as may subsequently be needed for changing or adding splices.

As mentioned earlier, the invention contemplates the use of tray restraint clips 180, 181 to support the superposed splicing trays 172 when the assembly is used with any type cable including buffered cable. Additionally, one or more of the splicing trays 172 are positioned in stacked relationship above the bottom storage bar 176 and function to hold in an organized manner the splice connectors in the associated fiber cables. Although the splicing trays 172 could have a variety of configurations, one example of the form for the trays 172 in the subject embodiment is shown in FIGS. 10–14. As illustrated therein, the splicing trays 172 generally comprise a U-shaped molded plastic tray member having an outer peripheral size and shape that generally corresponds to the size and shape of the subjacent storage tray 172. As illustrated in FIGS. 13 and 14, the tray 172 includes a flat bottom wall 230 and upwardly extending side walls 232, 234. End walls 236, 238 are generally formed by upwardly extending integral formations with the wall 238 being formed so as to provide a cable entrance area 240 which opens to the interior of the tray 172 and includes a plurality of spaced vertically extending walls 248 which define a group of separate passages through which groups of fiber optic cable can be directed to the interior of the tray 172. The trays 172 also include contoured interior wall 250 surfaces which facilitate the bending of the cable and its positioning as coiled loops within the tray 172. Associated with the bottom wall 230 of the tray 172 is a raised arcuate wall 252 which also serves to direct the cable and allow it to be suitably coiled about the interior of the tray 172. The splicing trays 172 are also provided with retainers or capture tabs 254 that are releasably retained in position by the side, end, or raised arcuate walls 232, 234, 236, 252, respectively.

Associated with the bottom wall 230 of the tray 172 are a plurality of upwardly extending resilient webs 260 that extend generally perpendicular to the sides 232, 234 and are preferably formed integrally with the bottom wall 230 to define a multiplicity of upwardly open, transversely extending slots 262. The spacing between the webs 260 and thus the width of the slots 262 is selected so as to allow the connectors used in forming the splices to be retained therein. These widths can vary at different points along the row of webs 260 so that the various commercially available and commonly used connectors can be held in an organized and convenient manner. Preferably, there are slots (not shown) through the bottom of the tray at locations between webs 260 to facilitate removal of the splice connectors held between the webs 260. That is, the slots 262 allow a screwdriver or the like to be inserted upwardly through the bottom wall 230 of the tray 172 to push the connectors out of the spaces between the webs 260. The subject embodiment also provides the option of retaining the connectors and their associated fiber cables in their position through the use of strips of double sided pressure-sensitive adhesive tape (not illustrated) positioned in the bottom of the tray adjacent the opposite ends of the slots.

An important advantage flowing from the described mounting of the trays 172 relative to the tray restraint clips 180, 181 is that lower ones of the trays in the storage stack can be accessed without total removal of superposed trays 172. Merely by pushing the front end of the tray 210 from the flexible walls 214, 216 of the clip 180, the front end of the tray 210 may be pivoted outward until the tray 172 is accessible. Individual selected lower trays 172 can similarly be pivoted outwardly from between the other trays 172 in the stack while the other end 212 of the tray 172 remains engaged with the rear restraint clip 181. After work within the tray 172 is completed, it can be returned to its location in the stack merely by reversing the procedure described above.

Another advantage flowing from the housing 12 construction is the ability to increase the effective size of the storage chamber 18 without disturbing or disassembling the previously assembled splice trays 172 and the overall tray support assembly 16. To understand this aspect of the invention, it should be noted that, as previously discussed, the housing member 12 can be removed from its clamped engagement with the end plate 80 without affecting the structural integrity of the remaining structure, i.e., the end plate 80, the top organizer bar 174, the bottom storage bar 176, and the fiber splicing trays 172. Thus, it is possible to reinstall a fiber organizer system 16 in a housing having larger internal dimensions (so long as the end flange section corresponds to the size of end plate). All this can take place without disturbing the previously made up trays 172.

In addition to the above, it is possible to further increase the space available by increasing the height of the storage tray stack to thus allow more trays 172 to be installed beyond what was the maximum available originally (i.e. greater than six). This can be accomplished by removing the top organizer bar 174 and replacing it with a modified organizer bar (not illustrated). Note that removal and replacement of the top organizer bar 174 does not really affect or alter the end plate 80 and storage tray subassemblies structural integrity. A modified top organizer bar, for example, may provide additional space for increasing the height of the storage tray stack because of a bowed or upwardly bent center section. Also, if desired, the height of the guide posts 188, 190 can be increased by suitable extensions (not illustrated) added to their upper ends.

Figure 15:
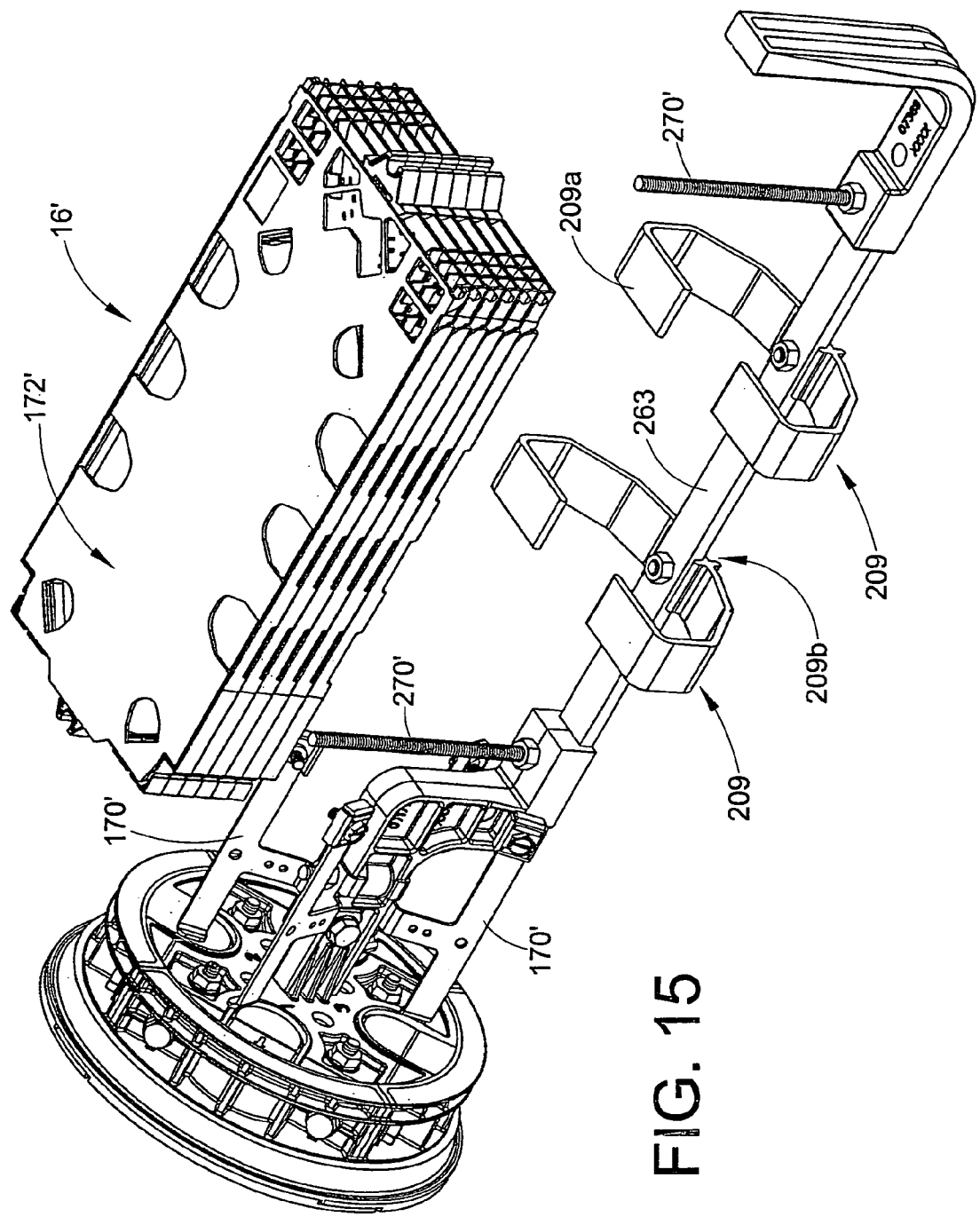
FIG. 15 is an asymmetric view of a buffer tube organizer used in the cylindrical housing in accordance with another embodiment of the subject fiber closure system.
Figure 16:
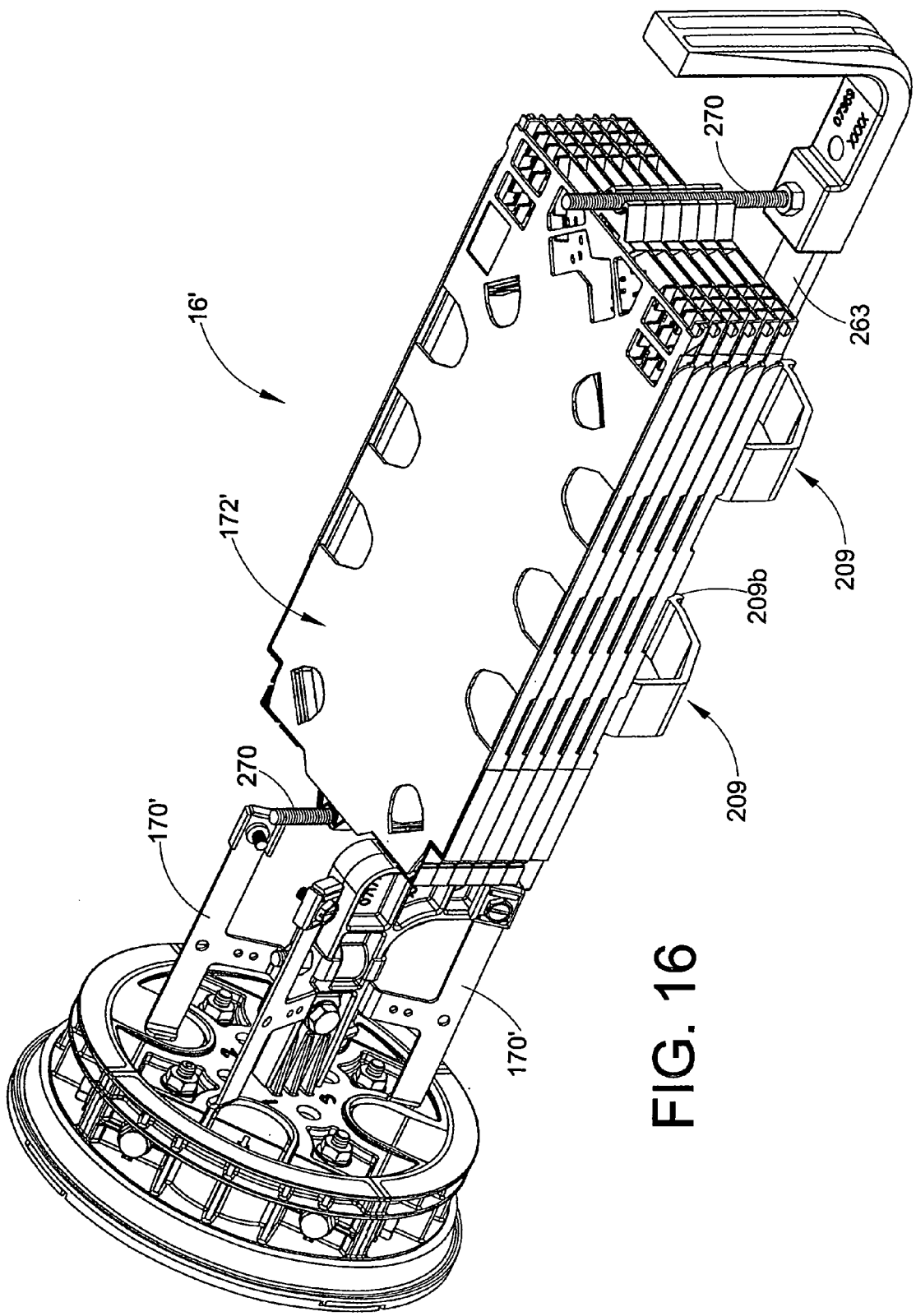
FIG. 16 is a view of the buffer tube organizer of FIG. 15 shown with the set of splice trays received on support rods.

As noted above, a buffer tube organizer 16' for use in the subject fiber splice closure is shown in FIGS. 15 and 16. A unitube organizer 16" is shown in FIGS. 17 and 18. With reference now to those Figures, the support assemblies 16', 16" are adapted to mount within the chamber of the splice closure and are further adapted to carry one or more splice trays and also are provided for storing excess cable. The organizer form illustrated in FIGS. 15 and 16 is intended for use with buffered cable and relies on brackets 209 that provide an open space under the splice trays for storage of excess lengths of cable.

The unitube organizer 16" of FIGS. 17 and 18 is intended for use with unitube type fiber optic cable and includes a storage tray 269. In the FIGS. 17 and 18 form, the storage tray 269, as well as superposed spliced trays 172' are supported from below by an axially extending rigid elongated support bar 263. The storage tray 269 includes a pair of opposing support brackets 271 having mounting holes or openings 273 therethrough. The brackets 271 include capture tabs 275 for restraining the cables therebelow. A pair of parallel spaced threaded rods or bolts 270 extend upwardly from support bar 263 and through the openings 273 in the brackets 271. In this arrangement, as mentioned above, the storage tray 269 is intended to maintain and provide a place where extra lengths of unitube type optical cable can be coiled and retained as may subsequently be needed for changing or adding splices. The parallel rods 270 hold the trays 172' and 269 in a stacked relationship.

The buffer tube organizer 16' illustrated in FIGS. 15 and 16 contemplates the use of brackets 209 to support a plurality of superposed splice trays 172' when the assembly is used with buffered cable. As shown, a set of brackets 209 are provided for engagement with the underside of the superposed spliced trays 172'. Each bracket 209 has a general U-shape configuration with inwardly extending horizontal support portions 209a at the upper ends of the legs. The brackets 209 are joined to the lower bar member 263 by suitable bolts as shown. A set of tabs 209b are arranged to engage on the lateral sides of member 263. These tabs center and locate the brackets 209 and prevent their rotation relative to the member 263. The space within the brackets and beneath the support portions 209a provides space for coiling and storing excess lengths of optic cable.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

What is claimed is:

1. A housing assembly for enclosing and storing cable splices comprising:
   a housing member having a closed end and an open end and defining a storage chamber;
   an end plate selectively received in the open end, said end plate including a substantially planar end plate body defining i) a plurality of cable entrance openings for receiving associated cables therethrough and into said storage chamber, and ii) a plurality of inner openings;
   a plurality of cable caps circumferentially spaced apart over an outer peripheral edge of the end plate body and adjacent said plurality of cable entrance openings, the plurality of cable caps being selectively removable to permit said associated cables to be individually selectively moved radially through said end plate body into and out of selected ones of said plurality of cable entrance openings;
   a pierceable grommet received in one of said plurality of inner openings, the pierceable grommet selectively receiving a wire therethrough; and,
   a plurality of sealing walls selectively positionable in said plurality of cable entrance openings for blocking selected ones of the said plurality of cable entrance openings of the end plate body.

2. The housing assembly of claim 1, wherein said end plate is substantially circular and includes at least four said cable caps.

3. The housing assembly of claim 1, wherein each said cable cap has a bottom surface including a soft sealing material for mating with a portion of a perimeter of said end plate body.

4. The housing assembly of claim 3, wherein said cable caps each include at least one fastener for fastening said cable caps to said end plate body.

5. The housing assembly of claim 1, further including an air valve through said end plate body, said valve in communication with the interior of said housing member for pressurization of the housing assembly.

6. The housing assembly of claim 1, wherein said grommet includes a pierceable tip configured to receive a ground wire therethrough.

7. The housing assembly according to claim 1 wherein:
   said plurality of cable entrance openings define grooves configured to slidably receive said plurality of sealing walls.

8. The housing assembly according to claim 1 wherein:
   each of said plurality of sealing members is selectively positioned in said plurality of cable entrance openings.

9. The housing assembly according to claim 8 wherein:
   said plurality of cable entrance openings define a pair of spaced apart grooves configured to slidably receive said pairs of sealing wall members.

10. A housing assembly for enclosing and storing cable splices comprising:
    a housing member having a closed end and an open end and defining a storage chamber therebetween;
    an end plate received in the open end, said end plate including an end plate body having i) a plurality of inner openings therethrough; ii) a plurality of cable entrance openings configured to selectively receive associated cables therethrough by moving the associated cables radially through the end plate into and out of selected ones of the plurality of cable entrance openings, and iii) a plurality of selectively removable cable caps for holding said associated cables in said cable entrance openings;
    a resilient pierceable grommet selectively received in each said inner opening; and,
    at least one sealing wall selectively located in a first one of said plurality cable entrance openings for blocking the first one of the entrance openings.

11. The housing assembly of claim 10, further including an air valve through said end plate body, said valve in communication with the interior of said housing member for pressurization of the housing assembly.

12. The housing assembly of claim 10, wherein said end plate includes at least four said cable caps.

13. The housing assembly of claim 12, wherein each said cable cap has a bottom surface including a soft sealing material for mating with a portion of a perimeter of said end plate body.

14. A housing assembly for enclosing and storing cable splices comprising:
    a housing member having an open end and a removable end plate selectively received in the open end for defining a storage chamber therein;
    said end plate including an end plate body defining a plurality of circumferentially spaced apart openings and an inner opening;

a plurality of sealing walls selectively received in said spaced apart openings;

a plurality of selectively removable cable caps for accessing individual cables passing through said spaced apart openings defined by end plate;

a collar releasably and sealingly engaged around said open end of said housing for securing said end plate within said housing said housing; and, a grommet disposed in said inner opening, the grommet being pierceable by an associated, ground wire extending through said grommet and into said storage chamber.

15. The housing assembly of claim 14, wherein said collar comprises a split configuration having two sections hingedly connected at a pivot point.

16. The housing assembly of claim 15, wherein said collar includes an inside perimeter having an asymmetrical U-channel.

17. The housing assembly of claim 16, wherein said U-channel includes a first leg and a second leg, said first leg is shorter than said second leg.

18. The housing assembly of claim 15, wherein said collar includes two ends, said ends comprise a female portion and a male portion for latching said collar around said open end of said housing.

19. The housing assembly of claim 14, further including an air valve through said end plate body, said valve in communication with the interior of said housing member for pressurization of the housing assembly.

20. The housing assembly of claim 14, wherein said end plate includes at least four said cable caps.

21. The housing assembly of claim 14, wherein each said cable cap has a bottom surface, said bottom surface includes a soft sealing material for mating with a portion of a perimeter of said end plate body.

22. The housing assembly of claim 21, wherein said cable caps each include at least one fastener for fastening said cable caps to said end plate body.

* * * * *